(12) United States Patent
Hattori et al.

(10) Patent No.: US 6,496,771 B2
(45) Date of Patent: Dec. 17, 2002

(54) VEHICLE OPERATION CONTROL METHOD AND APPARATUS THAT CONTROLS DECELERATION OF A VEHICLE

(75) Inventors: Akira Hattori, Nagoya (JP); Nobuyuki Furui, Nisshin (JP); Hironori Miyakoshi, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/927,468

(22) Filed: Aug. 13, 2001

(65) Prior Publication Data

US 2002/0026276 A1 Feb. 28, 2002

(30) Foreign Application Priority Data

Aug. 29, 2000 (JP) .......................... 2000-258969

(51) Int. Cl.$^7$ ................................. G06F 7/70
(52) U.S. Cl. .................. 701/96; 701/70; 701/79; 701/301; 340/435; 340/903
(58) Field of Search .............. 701/96, 78, 79, 701/110, 301, 70; 340/435, 903; 342/455; 180/167, 175

(56) References Cited

U.S. PATENT DOCUMENTS 6,134,497 A * 10/2000 Hayashi et al. .............. 701/70

FOREIGN PATENT DOCUMENTS

| JP | A 8-192659 | 7/1996 |
| JP | A 9-323628 | 12/1997 |

* cited by examiner

Primary Examiner—William A. Cuchlinski, Jr.
Assistant Examiner—Arthur D. Donnelly
(74) Attorney, Agent, or Firm—Oliff & Berridge, PLC

(57) ABSTRACT

A vehicle operation control apparatus for controlling a running state of a vehicle based on a relative positional relationship between the vehicle and a preceding vehicle running in a predetermined area ahead of the vehicle. The vehicle operation control apparatus comprises a controller that determines a target deceleration of the vehicle based on the relative positional relationship between the vehicle and the preceding vehicle. The controller controls a deceleration of the vehicle so that the deceleration of the vehicle approaches the target deceleration and maintains the target deceleration until a predetermined condition is satisfied.

26 Claims, 20 Drawing Sheets

[OFF STATE]

[ON STATE]

VEHICLE OPERATION CONTROL METHOD AND APPARATUS THAT CONTROLS DECELERATION OF A VEHICLE

INCORPORATION BY REFERENCE

The disclosure of Japanese Patent Application No. 2000-258969 filed on Aug. 29, 2000, including the specification, drawings and abstract is incorporated herein by reference in its entirety.

BACKGROUND OF THE INVENTION

1. Field of Invention

The invention relates to a vehicle operation control method and apparatus during deceleration of a vehicle.

2. Description of Related Art

In a running control apparatus described in Japanese Patent Application Laid-Open No. 9-323628, during braking, a target deceleration is determined based on at least one of the distance between the vehicle and another preceding vehicle and a relative speed therebetween. The target deceleration is increased as the inter-vehicle distance is decreased, and is increased as the relative speed increases.

If the target deceleration is determined based on at least one of the inter-vehicle distance and the relative speed as mentioned above, the target deceleration continuously changes with changes in the inter-vehicle distance and the relative speed, and the deceleration of the vehicle is correspondingly changed. If the frequency of changes in the deceleration is great (i.e., the deceleration changes highly frequently), an uncomfortable feeling is experienced by an operator.

SUMMARY OF THE INVENTION

The invention has been accomplished in view of the aforementioned problem. It is an object of the invention to reduce the uncomfortable feeling given to an operator of a vehicle when the vehicle is decelerated by a vehicle operation control apparatus. The vehicle operation control apparatus controls a running state of the vehicle based on a relative positional relationship between the vehicle and another preceding vehicle running in a predetermined set area ahead. This object is achieved by constructing a vehicle operation control apparatus as described below.

In accordance with the invention, the vehicle operation control apparatus controls the running state of an vehicle based on the relative positional relationship between the vehicle and a preceding vehicle running in a predetermined set area ahead of the vehicle. The running control apparatus includes a controller that determines a target deceleration of the vehicle, controls a deceleration of the vehicle so that the deceleration of the vehicle approaches the target deceleration and maintains the target deceleration determined until a predetermined condition is satisfied.

Furthermore, a control method for controlling a vehicle operation state of a vehicle based on a relative positional relation ship between the vehicle and a preceding vehicle running in a predetermined set area ahead of the vehicle is determined. The control method determines target deceleration of the vehicle, and the deceleration of the vehicle is controlled so as to approach the target deceleration. The determined target deceleration is maintained until a predetermined condition is satisfied.

In the running control apparatus and the control method described above, the determined target deceleration is maintained until the predetermined condition is satisfied. That is, the same value of the target deceleration is maintained until the predetermined condition is satisfied. Until then, the speed of the vehicle is reduced at a constant deceleration. Therefore, the frequency of changes in the deceleration can be reduced, and the uncomfortable feeling to an operator can also be reduced.

BRIEF DESCRIPTION OF THE DRAWINGS

The above mentioned and other objects, features, advantages, technical and industrial significance of this invention will be better understood by reading the following detailed description of the preferred embodiments of the invention, when considered in connection with the accompanying drawings, in which.

DETAILED DESCRIPTION OF PREFERRED EMBODIMENTS

In the following description and the accompanying drawings, the present invention will be described in more detail with reference to an exemplary, preferred embodiment.

An example of a vehicle operation control apparatus in accordance with the invention will be described. This vehicle operation control apparatus includes a warning device.

Figure 1:
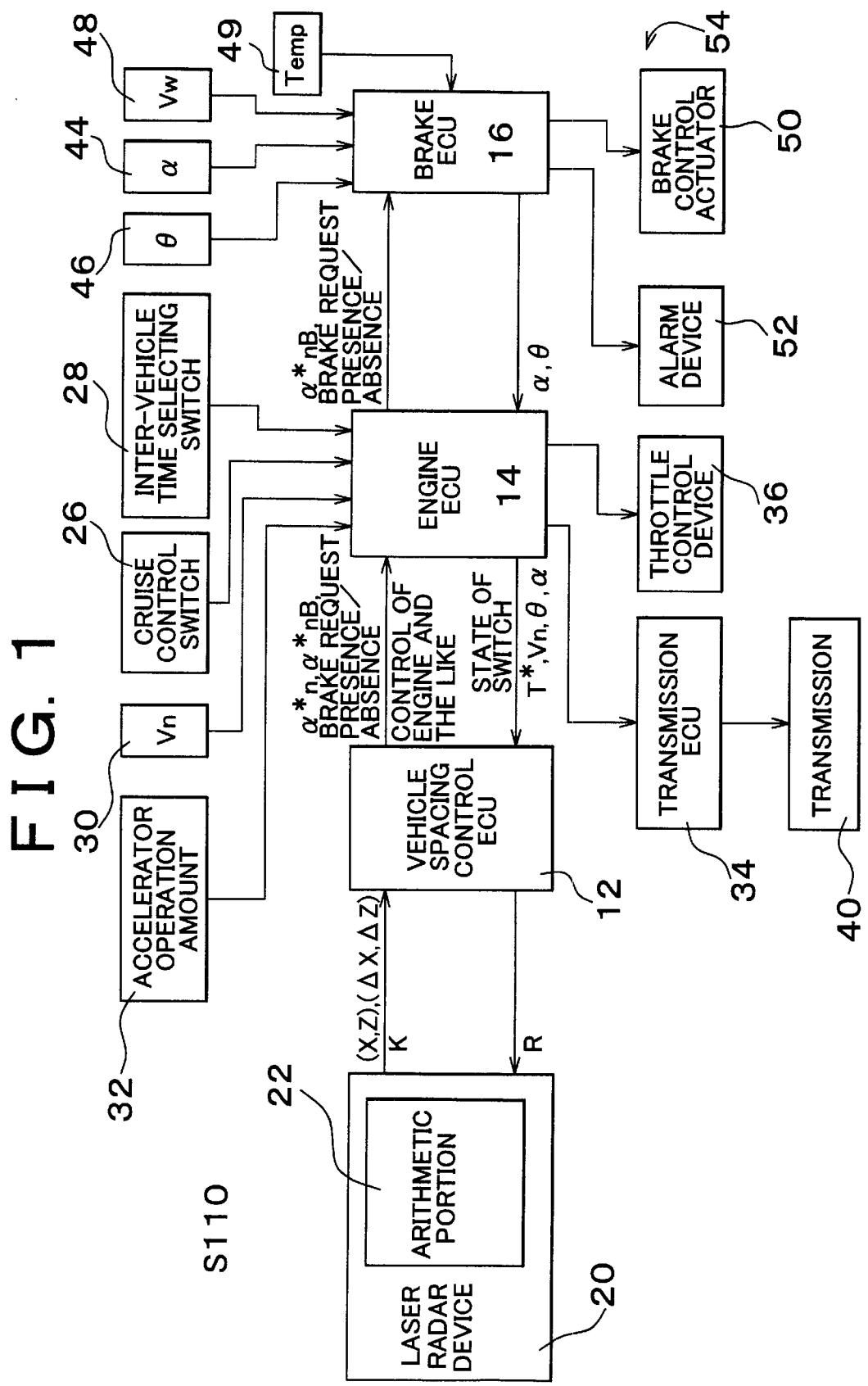
FIG. 1 is a diagram illustrating an overall construction of a vehicle operation control apparatus in accordance with an embodiment of the invention.

Referring to FIG. 1, a vehicle spacing control ECU 12, an engine ECU 14, and a brake ECU 16 of a vehicle are shown. The vehicle spacing control ECU 12, the engine ECU 14 and the brake ECU 16 is formed mainly by a computer that includes a CPU, a RAM, a ROM, an input/output portion, etc. The vehicle spacing control ECU 12 and the brake ECU 16 are connected to the engine ECU 14, and communications of information are performed among them.

In the illustrated embodiment, the vehicle spacing control ECU 12, the engine ECU 14, the brake ECU 16, a transmission ECU 34 and an arithmetic portion 22 are implemented as a programmed general purpose computers. It will be appreciated by those skilled in the art that the controllers can be implemented using a single special purpose integrated circuit (e.g., ASIC) having a main or central processor section for overall, system-level control, and separate sections dedicated to performing various different specific computations, functions and other processes under control of the central processor section. The controllers can be a plurality of separate dedicated or programmable integrated or other electronic circuits or devices (e.g., hardwired electronic or logic circuits such as discrete element circuits, or programmable logic devices such as PLDs, PLAs, PALs or the like). The controllers can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as any one of the controllers. A distributed processing architecture can be used for maximum data/signal processing capability and speed.

A laser radar device 20 is electrically connected to the vehicle spacing control ECU 12. The laser radar device 20 includes an arithmetic portion 22 that is formed mainly by a computer. The arithmetic portion 22 determines a relative position of a detected object body relative to the vehicle and the amount of change in the relative position, and transmits information indicating the relative position and the amount of change in the relative position to the vehicle spacing control ECU 12. Furthermore, the arithmetic portion 22 determines a probability K (hereinafter, referred to as "same-lane probability") that the detected object body, (e.g., another preceding vehicle) is running on the same lane as the vehicle, and transmits it to the vehicle spacing control ECU 12.

The laser radar device 20 is a device described in Japanese Patent Application Laid-Open No. 11-45398, and will not be described herein. The laser radar device 20 is disposed in a forward portion of the vehicle, for example, below a front bumper. The laser radar device 20 emits laser light toward another preceding vehicle, and receives light reflected therefrom. The lapser radar device 20 is of a two-dimensional scan type in which laser light is scanned Within a predetermined irradiation area in the horizontal and perpendicular directions due to rotation of a polygon mirror. In this embodiment, the irradiation area that is irradiated with laser light is divided into 630 small areas in a pattern of 105 areas in the horizontal direction and 6 areas in the perpendicular direction. Based on the state of reception of light reflected from small areas, an object body within the set area is detected. With respect to the vehicle equipped with the laser radar device 20, another preceding vehicle that comes into the set area is detected.

As means for measuring an inter-vehicle distance between the vehicle and another preceding vehicle, a sound-wave-type sensor using microwave or a sensor for measuring an inter-vehicle distance by using images of two cameras may be also available.

With regard to the laser radar device 20, it is possible to set an area in which an object body can be detected by the laser radar device 20. In this embodiment, however, the set area is determined based on the irradiation area and the smaller one of the distance of emission of laser light and the distance of reception of reflected light. The set area is determined by the capability of the laser radar device 20, and may also vary depending on climate.

In the laser radar device 20, areas that are estimated to indicate one and the same body based on the state of reception of reflected light are combined, and a relative position (two-dimensionally expressed) of the combined area (one and the same object body) is determined.

The relative position is represented by a point on a two-dimensional plane coordinate system defined by a predicted running line of the vehicle and a line perpendicular to the predicted running line (i.e., a line parallel to the direction of the width of the vehicle) with reference to the vehicle. The predicted running line is determined based on the turning radius R of the vehicle and the like. The position Z of the detected object body in the predicted running direction represents the distance thereof from the vehicle along the predicted running line, that is, the inter-vehicle distance Z. The position X of the detected object body in the width direction is a deviation of the object body from the vehicle in the direction perpendicular to the predicted running line of the vehicle. In this embodiment, the plane coordinate system defined by the predicted running line and a line perpendicular to the predicted running line is transformed into an orthogonal plane coordinate system by transforming the predicted running line to a straight line. The position (X, Z) on the transformed orthogonal plane coordinate system is determined as a relative position of the object body.

The same-lane probability K is determined based on the relative position (X, Z) of the object body. An area (X by Z) expressed by the orthogonal plane coordinate system is divided into a plurality of areas. Based on which one of the areas the relative position (X, Z) of the object body, the same-lane probability K is determined. A bell-shaped area forward of the vehicle, that is, a tapered area that becomes narrower in the X direction with progress in the Z direction, is set as a first area A1. An area including a portion extending forward of the first area A1 and portions extending in the X directions (directions of the vehicle width) from the first area A1 is set as a second area A2. Likewise, a third areas A3, a fourth area A4, . . . are provided in that order with increases in the distance from the vehicle. The nth area An has a portion that is farther apart from the vehicle than the (n−1)th area A(n−1) is. An area with an increased number n has a portion that spreads greater in the X directions with progress in the Z direction. Each area An is stored in correspondence to a probability Kn in the arithmetic portion 22. The value of the probability Kn decreases with increases in the number n.

For example, if a center point (X, Z) of the object body belongs to the mth area Am, the same-lane probability Km corresponding to the mth area Am is set as a same-lane probability K(=Km). Information indicating the relative position (X, Z) of the object body in the two-dimensional orthogonal coordinate system, information indicating the amount (ΔX, ΔZ) of change in the relative position, and information indicating the same-lane probability K are transmitted from the laser radar device 20 to the vehicle spacing control ECU 12. The relative position (X, Z) of the object body transmitted to the vehicle spacing control ECU 12 is the relative position of the center point of the object body. However, a representative position other than the central point of the object body may also be set as the relative position of the object body.

The same-lane probability K may also be determined taking into consideration the relative position of a point in an object body other than its center point. For example, if at least a portion of an object body (e.g., a portion of an exterior thereof) belongs to the first area A1, the same-lane probability K is set to K1. Furthermore, it is also possible to determine areas to which a plurality of points representing the object body and to set, as a sane-lane probability K, the mean value or an intermediate value of the values of probability corresponding to the determined areas. In this case, the same-lane probability K may be determined taking measurements into consideration. For example, the measurement on the area to which the center point belongs is increased, and the measurement on the areas to which points defining the external shape of the object body belongs is reduced.

The same-lane probability K may be determined based on a result of a detection of an object body, and may also be determined based on a previously determined same-lane probability as well. In that case, the specific weight of a present same-lane probability relative to the previous same-lane probability can be determined based on the inter-vehicle distance Z. For example, the specific weight may be increased with decreases in the inter-vehicle distance Z. It is also possible to adopt a construction in which the same-lane probability K is determined by the vehicle spacing control ECU 12. Information indicating the relative position and the like transmitted from the laser radar device 20 to the vehicle spacing control ECU 12 may also be information regarding all the small areas that are considered to be object bodies after the grouping.

Based on the relative position of the object body and the amount of change in the relative position (or based on the relative speed of the object body and the speed of the vehicle) received from the laser radar device 20, the vehicle spacing control ECU 12 determines whether the object body is in a relative moving state or a relative static state. If an approaching speed, that is, a kind of the relative speed, is at most a set speed, or if the absolute value of a difference between the relative speed and the speed of the object body and the vehicle is at most a predetermined set value (if the two speeds are almost equal), it may be possible to determine that the object body is in a relative static state.

Furthermore, based on the relative position of the object body and the amount of change in the relative position, information received from the engine ECU 14, etc., the vehicle spacing control ECU 12 determines a target deceleration α*n of the vehicle, a desired brake target deceleration α*nB thereof, etc. Furthermore, the vehicle spacing control ECU 12 prepares information for controlling the engine and the like, information indicating the presence/absence of a brake request, etc., and transmits such information to the engine ECU 14. The information indicating the presence/absence of a brake request, the information indicating the desired brake target deceleration a*nB, etc., are transmitted to the brake ECU 16 via the engine ECU 14.

Further referring to FIG. 1, the vehicle spacing control ECU 12 determines a turning radius R of the vehicle based on the steering angle θ of a steering wheel, and the running speed Vn, and then transmits information indicating the turning radius R to the laser radar device 20. The information indicating the steering angle θ of the steering wheel is received from the brake ECU 16 via the engine ECU 14. The information indicating the running speed Vn is received from the engine ECU 14.

The engine ECU 14 is connected to a cruise control switch 26, an inter-vehicle time selecting switch 28, a vehicle speed sensor 30, and an accelerator operation amount sensor 32, etc. The engine ECU 14 is also connected to a transmission ECU 34, and a throttle control device 36 that is a component element of the engine apparatus, etc. Based on the accelerator operation amount and the like, the engine ECU 14 controls driving states of various component elements of the engine apparatus.

The cruise control switch 26 is a switch that is changeable at least between a position for commanding a cruise control and a position for not commanding the cruise control. The inter-vehicle time selecting switch 28 is a switch for selecting the inter-vehicle time in a situation where the cruise control is commanded. The cruise control switch 26 and the inter-vehicle time selecting switch 28 are operated by an operator. By operating the inter-vehicle time selecting switch 28, an operator can set a requested relative position relationship that the operator intends.

The inter-vehicle time selecting switch 28 allows selection of one of three inter-vehicle times, that is, short, intermediate and long inter-vehicle times. The short, intermediate and long inter-vehicle times are, for example, lengths of time that correspond to inter-vehicle distances of about 40 m, about 45 m, and about 55 m when the vehicle is running at 80 km/h. In the cruise control operation, the state of running of the vehicle is controlled so that the inter-vehicle distance between the vehicle and the preceding vehicle is kept equal for an inter-vehicle distance corresponding to the selected inter-vehicle time. However, if another preceding vehicle is not detected, a control is performed such that the vehicle runs at a speed equal to or lower than a set speed. In this case, the setting, of a speed is separately performed by an operator.

The state of the cruise control switch 26 (information indicating a cruise control commanded or a cruise control not commanded), the state of the inter-vehicle time selecting switch 28 (information indicating a requested inter-vehicle time, selected as mentioned above), and information indicating the speed of the vehicle detected by the vehicle speed sensor 30 are transmitted to the vehicle spacing control ECU 12. Such information may be termed desired cruise control vehicle information. That is, the information is vehicle information needed for the cruise control.

The cruise control is prohibited when an accelerator pedal is operated by an operator, or when a brake pedal is operated by an operator, etc. The cruise control is also prohibited at the time of execution of an antilock brake control and a vehicle behavior control, etc. It is desirable that higher priority be given to operations performed by an operator than to the cruise control operation. In view of safety improvement, it is also desirable that higher priority be given to the antilock brake control and the vehicle behavior control, etc., rather than to the cruise control. Furthermore, the cruise control operation is prohibited if pa system abnormality is detected. The aforementioned prohibition of the control includes at least one of a discontinuation of the control (including a temporarily stop) and prohibition of start of the control.

In accordance with the information received from the vehicle spacing control ECU 12, the engine ECU 14 controls they throttle control device 36 and transmits a control command regarding the transmission speed ratio to the transmission ECU 34. In accordance with the speed ratio control command from the engine ECU 14, the transmission ECU 34 controls a transmission 40 to control the speed ratio. In this embodiment, the transmission 40 has five forward speeds (the fifth speed being an overdrive speed) and one reverse speed. However, this is not restrictive, and the transmission 40 may have different numbers of forward and rearward speeds.

The engine ECU 14 transmits to the brake ECU 16, brake control information received from the vehicle spacing control ECU 12, etc. The brake control information includes information indicating the presence/absence of a brake request, information indicating the desired brake target deceleration α*nB, etc. Instead of the control of the throttle control device 36, a control of the amount of fuel injected into a combustion chamber or the like may be performed.

The brake ECU 16 is connected to a deceleration sensor 44, a steering angle sensor 46 for detecting the steering angle θ of the steering wheel, wheel speed sensors 48 for detecting rotation speeds of wheels, a temperature sensor 49, etc. The brake ECU 16 is also connected to a brake control actuator 50, an alarm device 52 and various other components.

During the cruise control, the brake control actuator 50 is controlled so that the actual deceleration an detected by the deceleration sensor 44 approaches a desired brake target deceleration α*nB received from the engine ECU 14. During a vehicle stability control, the brake control actuator 50 is controlled so that the behavior of the vehicle remains in a stable state based on the steering angle, the yaw rate, etc. The brake ECU 16 is an ECU for controlling the brake control actuator. As a brake ECU, it is possible to use an ECU that performs a specific control, such as an ABSECU (antilock brake ECU), a VSCECU (vehicle behavior ECU), etc.

The information indicating the steering angle e of the steering wheel is transmitted to the vehicle spacing control ECU 12 via the engine ECU 14 as mentioned above.

The alarm device 52 is operated, for example, when the inter-vehicle distance Z becomes equal to or below an approach distance Dw or in a case where automatic brake actuation is not desirable, although a brake request information has been transmitted. In a first case, the alarm device 52 is operated in accordance with a command from the vehicle spacing control ECU 12. In another case, the alarm device 52 is operated due to the state of a brake device 54 or the state of running of the vehicle. In the first case, an alarm is produced mainly in order to indicate the inter-vehicle distance exceeding the approach distance Dw and to prompt a brake operation. In the latter case, an alarm is produced mainly in order to indicate that the automatic brake actuation has been prohibited. The alarm device 52 may produce the same alarm or different kinds of alarms in the former and latter cases. The alarm device 52 may produce a sound, or may turn a lamp on, and off. Furthermore, the alarm device 52 may output a content of alarm (state of vehicle) by voice, or may displace such a content. The alarm device 52 may be a device that has the function of a notification device for notifying an operator of a wide variety of information.

The deceleration sensor 44 is a sensor for detecting the deceleration of the vehicle. In this embodiment, the deceleration is expressed as a positive value. If the acceleration is expressed as a negative acceleration as in a conventional manner, a great deceleration in this embodiment means a small negative acceleration, that is, a great absolute value of the acceleration (equal to the deceleration herein). The wheel speed sensors 48 detect rotation speeds of the individual wheels. In this embodiment, a slip state of each wheel is detected based on the rotation speed of the individual wheels and an estimated vehicle body speed determined based on the speeds of wheels that are not drive wheels. The temperature sensor 49 detects the temperature of the brake control actuator 50.

Figure 2:
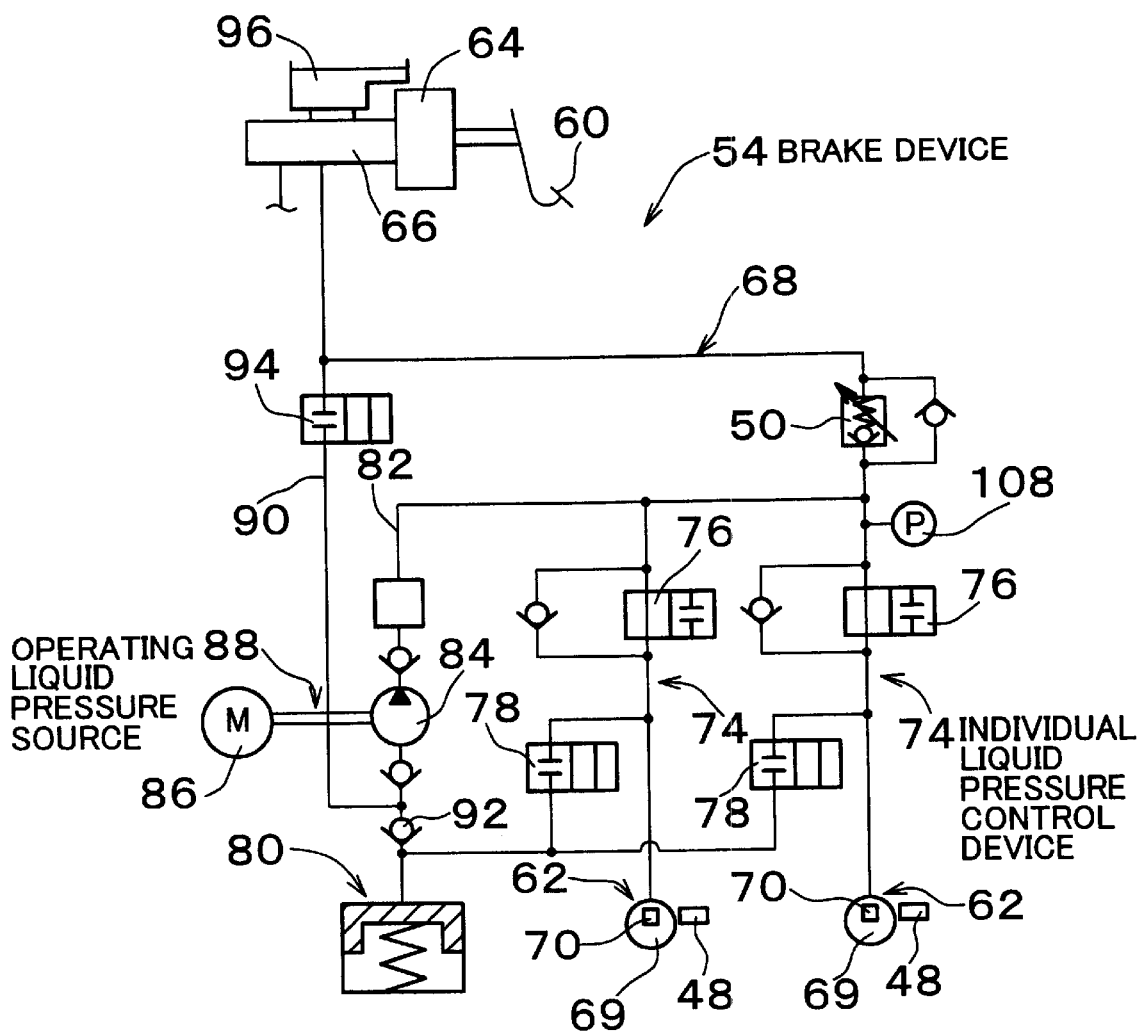
FIG. 2 is a circuit diagram of a brake device including a brake control actuator which is included in the vehicle operation control apparatus shown in FIG. 1.

FIG. 2 shows a brake circuit of the brake device 54 that includes the brake control actuator 50. The brake device 54 is able to operate a brake 62 even if the brake pedal 60, that is, a brake operating member, is not operated by an operator. That is, the brake device 54 is capable of performing automatic braking.

A master cylinder 66 is connected to the brake pedal 60 via a booster 64. The master cylinder 66 is connected to brake cylinders 70 of brakes 62 for retarding rotation of the wheels 69, via a liquid passage 68. The brake 62 is a hydraulic brake that is operated by liquid pressure in the brake cylinder 70 to retard rotation of the wheels 69.

A pressure control valve 50, (i.e., a brake control actuator) is provided in the liquid passage 68.

Individual liquid pressure control valve devices 74 are provided separately for the brake cylinders 70.

Each liquid pressure control valve device 74 includes a pressure increasing control valve 76 and a pressure decreasing control valve 78. The pressure increasing control valve 76 of each valve device 74 is provided between the pressure control valve 50 and a corresponding one of the brake cylinders 70, and the pressure decreasing control valve 78 is provided between the brake cylinder 70 and a reservoir 80.

A pump passage 82 extends from the reservoir 80, and connects to the liquid passage 68 downstream of the pressure control valve 50. The pump passage 82 is provided with a pump 84. The pump 84 is driven by a pump motor 86. The pump 84 and the pump motor 86 form a liquid pressure source 88.

An operating liquid supply passage 90 extends from the master cylinder 66, and connects to a portion of the pump passage 82 extending on a pump 84 side of a check valve 92. The check valve 92 prevents flow of the operating liquid from the master cylinder 66 to the reservoir 80. Due to the check valve 92, the operating liquid flowing out of the master cylinder 66 is pumped up directly by the pump 84. An electromagnetic open-close valve 94 is provided in the operating liquid supply passage 90.

When the electromagnetic open-close valve 94 is set to an open state, the operating liquid flows out of the master cylinder 66. That is, the operating fluid is supplied from a master reservoir 96 via the master cylinder 66.

Figure 3A:
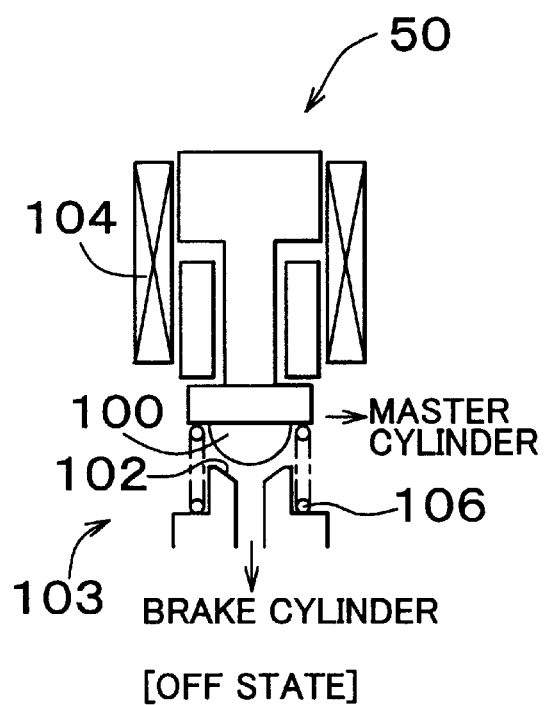
FIGS. 3a and 3b are diagrams of the brake control actuator shown in FIG. 2.
Figure 3B:
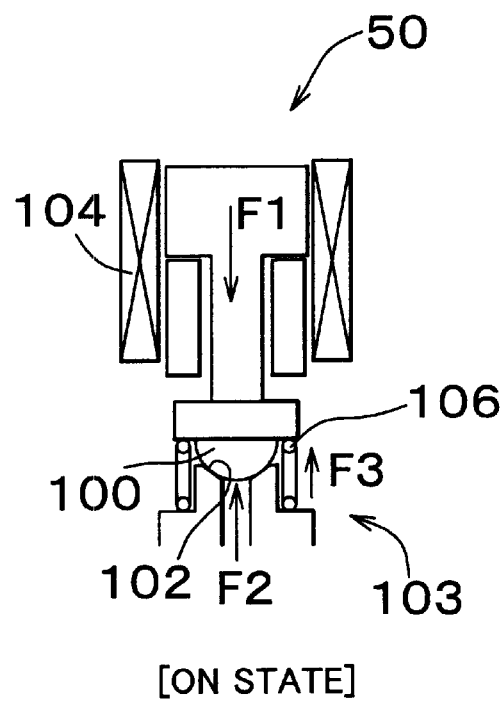

As shown in FIGS. 3a and 3b, the pressure control valve 50 includes a seating valve 103 that includes a valve body 100 and a valve seat 102, and a coil 104 that generates an electromagnetic force for controlling the relative position of the valve body 100 and the valve seat 102. The pressure control valve 50 is a normally-open valve in which the valve body 100 is separated from the valve seat 102 by elastic force of a spring 106 in a non-operating state (off state) where the coil 104 is not excited. In an operating state (on state) where the coil 104 is excited, the magnetic force F1 of the coil 104 acts in such a direction as to seat the valve body 100 onto the valve seat 102. The valve body 100 also receives a differential pressure force F2 based on the difference between the brake cylinder liquid pressure and the master cylinder liquid pressure and the elastic force F3 of the spring 106 in a direction opposite to the direction of the magnetic force, F1 of the coil 104.

When the brake pedal 60 is in a non-operated state, the liquid pressure in the master cylinder equals an atmospheric pressure, so that the differential pressure has a magnitude corresponding to the brake cylinder liquid pressure.

Within a region where the attracting force F1 is greater than the differential pressure force F2 based on the brake cylinder liquid pressure and the following expression applies:

$F2 \leq F1-F3$, the valve body 100 is seated on the valve seat 102, so that the operating liquid is prevented from flowing out of the brake cylinder 70. The liquid pressure in each brake cylinder 70 is increased by supplying the high-pressure operating liquid into the brake cylinder 70 from the pump 84.

When the differential pressure force F2 increases due to an increase in the brake cylinder liquid pressure so that the following expression applies:

$F2 \leq F1-F3$, the valve body 100 is separated from the valve seat 102. Then, the operating liquid is returned from the brake cylinders 70 to the master cylinder 66, and the brake cylinder liquid pressure is reduced to the master cylinder liquid pressure. If the elastic force F3 is ignored in the above expression, the brake cylinder liquid pressure is controlled to a liquid pressure that is higher than the master cylinder liquid pressure by a differential pressure based on the coil attracting force F1. A design is provided such that the magnitude of the attracting force F1, that is, the magnetic force of the coil 104, linearly changes in accordance with the magnitude of an exciting current I through the coil 104.

If the supply current I to the pressure control valve 50 is controlled while the liquid pressure source 88 is set in an operating state, the liquid pressure in each brake cylinder 70 is controlled. The supply current I can be feedback-controlled so that the brake liquid pressure detected by a pressure sensor 108 approaches a target liquid pressure. It is also possible to perform a feed-forward control instead of the feedback control. The brake 62 is operated by the operating fluid outputted from the liquid pressure source 88 so as to retard rotation of each wheel 69, even if the brake pedal 60 is not operated by an operator. If there is a need to control the liquid pressure in the brake cylinder 70 of each wheel separately as in the antilock brake control, the vehicle behavior control, etc., the liquid pressure is controlled by the control of each individual liquid pressure control device 74.

Operation of the vehicle operation control apparatus constructed as described above will now be described. The control apparatus performs the cruise control operation. In the cruise control operation, the state of running of the vehicle is controlled so that the inter-vehicle distance between the vehicle and another preceding vehicle is kept equal to an inter-vehicle distance corresponding to a selected inter-vehicle time as described above. However if there is a need to decelerate the vehicle, a decelerating control is performed. In the decelerating control, the transmission 40 and the throttle control device 36 of the engine apparatus are controlled or the brake device 54 is controlled so that the actual deceleration an approaches the target deceleration $\alpha^*n$. If the need to decelerate the vehicle is low, the throttle control device 36 and the transmission 40 are first controlled. If the need for deceleration is high and a brake operating condition is met, the control of the brake device 54 is added. That is, the control of the throttle control device 36 and the transmission 40 is assigned with a higher priority, so that the frequency of operating the brake device 54 becomes relatively low.

Figure 4:
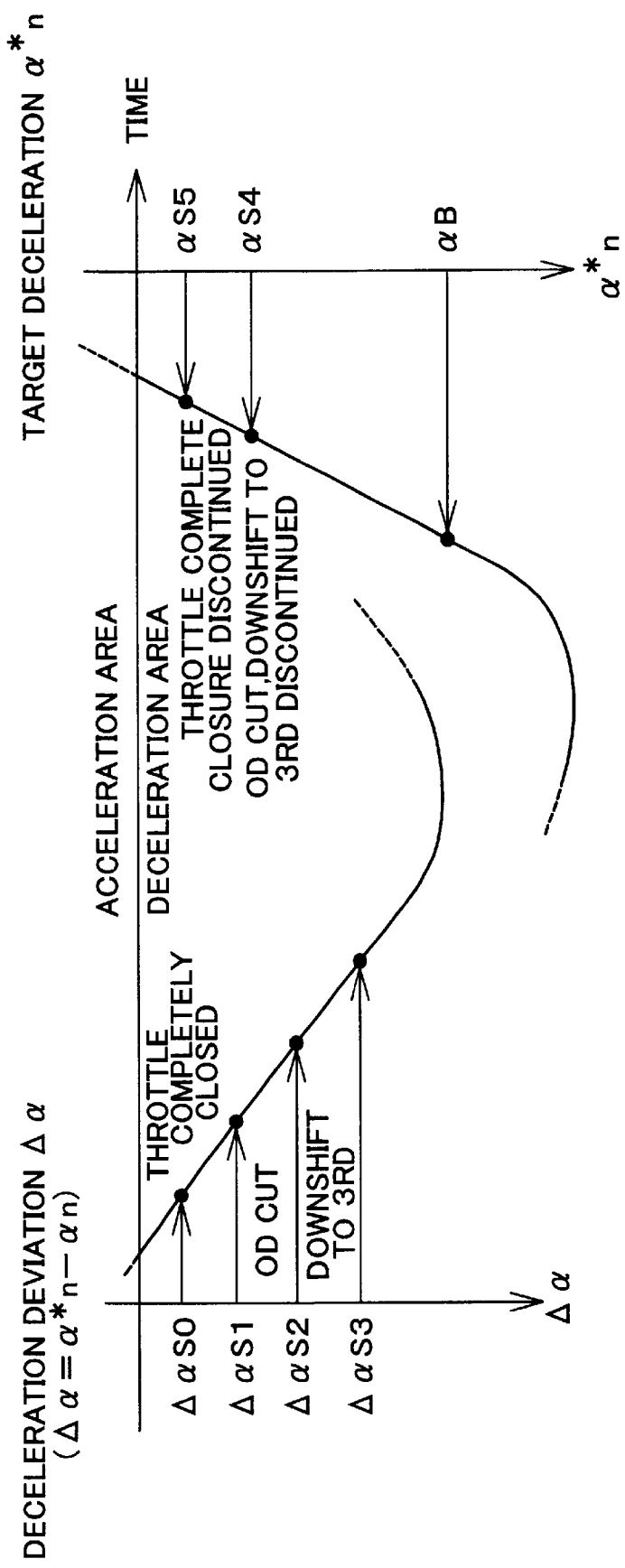
FIG. 4 is diagram indicating a control performed by the vehicle operation control apparatus.

An outline of the cruise control will be described with reference to FIG. 4. In this embodiment, the vehicle spacing control ECU 12 determines a target deceleration $\alpha^*n$ based on the requested inter-vehicle time T* selected by an operator, the actual inter-vehicle time T (value obtained by dividing the inter-vehicle distance Z by the speed Vn of the vehicle), and the relative speed Vr.

Then, a deceleration deviation $\Delta\alpha n$ is determined by subtracting the actual deceleration an from the target deceleration $\alpha^*n$. If the deceleration deviation $\Delta\alpha n$ is greater than "0", it is understood that the actual deceleration an is insufficient with respect to the target deceleration an* and therefore there is a need for deceleration (i.e., a need to increase the deceleration of the vehicle from the present level; in a case, the vehicle is presently being decelerated, and in another case, the vehicle is accelerating or running at a constant speed). Furthermore, it is understood that the need for deceleration is higher when the deceleration deviation $\Delta\alpha n$ is relatively great than when it is relatively small.

If the deceleration deviation $\Delta\alpha n$ is greater than "0", the degree of throttle opening is reduced. More specifically, the throttle control device 36 feedback-controls the degree of throttle opening so that the actual deceleration an approaches the target deceleration $\alpha^*n$. When the deceleration deviation $\Delta\alpha n$ reaches atleast a 0th threshold $\Delta\alpha s0$, the degree of throttle opening is set to "0" (completely closed). When the deceleration deviation $\Delta\alpha n$ reaches at least a 1st threshold $\Delta\alpha s1$, the shifting of the speed ratio to the fifth speed is prohibited (overdrive-cut). That is, if the present speed ratio is the fifth speed, the speed ratio is shifted down to the fourth speed.

Then, when the deceleration deviation Awn reaches at least a 2nd threshold $\Delta\alpha 2s$, the speed ratio is shifted down to the third speed. Furthermore, if the brake operating condition is met, the brake 62 is operated. If the brake operating condition is met, the liquid pressure source 88 in the brake device 54 is set to the operating state and the electric current is supplied to the pressure control valve 50. A magnitude of the supply electric current to the pressure control valve 50 is determined such that a desired brake target deceleration $\alpha^*nB$ is reached. Normally, the desired brake target deceleration $\alpha^*nB$ is different from the aforementioned target deceleration $\alpha^*n$ as described below. The desired brake target deceleration $\alpha^*nB$ is determined when the brake operating condition is met.

In contrast, if the inter-vehicle distance Z becomes smaller than the approach distance Dw, the alarm device 52 is operated. The approach distance Dw is determined as the sum of a first approach distance $Dw_1$ determined based on the speed Vn of the vehicle and the relative speed Vr, a second approach distance $Dw_2$ determined based on the actual deceleration an of the vehicle, and a third approach distance $Dw_3$ determined based on a relative deceleration αr. That is, instead of determining the first approach distance $Dw_1$ as an approach distance, a value corrected by the deceleration of the vehicle and the relative deceleration is determined as an approach distance.

Figure 5:
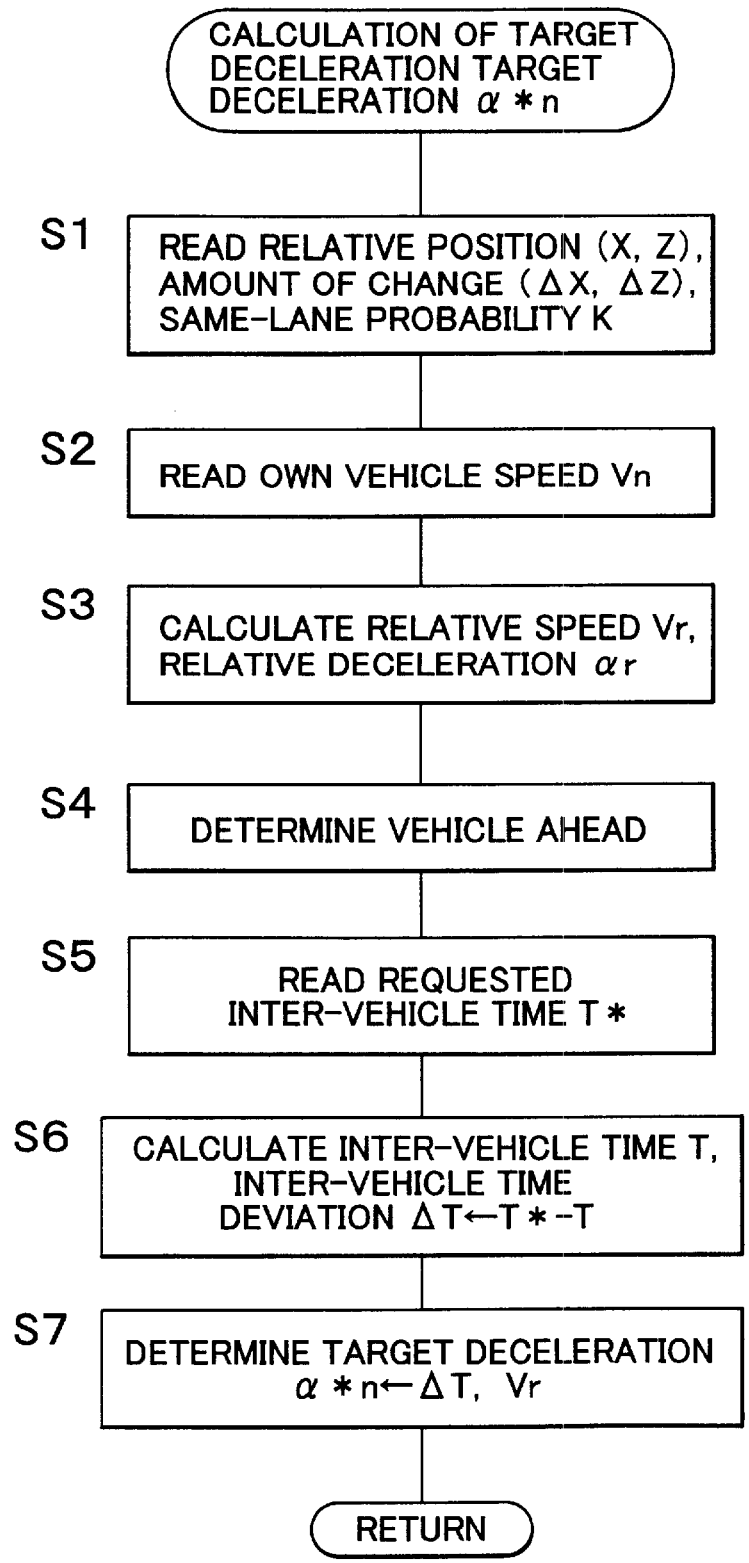
FIG. 5 is a flowchart illustrating a target deceleration determining program stored in a ROM of the vehicle spacing control ECU of the vehicle operation control apparatus.

The vehicle spacing control ECU 12 executes a target deceleration determining program illustrated by the flowchart of FIG. 5, every time the vehicle spacing control ECU 12 receives information from the laser radar device 20. The laser radar device 20 transmits information to the vehicle spacing control ECU 12 at every predetermined communication timing. The running speed Vn of the vehicle and the like are transmitted from the engine ECU 14. It is practicable to adopt a construction in which the running speed Vn and the like are transmitted from the engine ECU 14 in accordance with vehicle speed request information, or a construction in which the running speed Vn and the like are transmitted from the engine ECU 14 regardless of request information, and are stored in an input/output portion of the vehicle spacing control ECU 12. The communication between the engine ECU 14 and brake ECU 16 is likewise performed. In the vehicle spacing control ECU 12 or the like, a plurality of programs are concurrently executed in a time-divided manner.

In step 1 (hereinafter, simply referred to as "S1"; the other steps are likewise indicated), the relative position (X, Z) of an object body (or preceding vehicle), the amount of change (ΔX, ΔZ) in the relative position, and the same-lane probability K are read. Then, the process proceeds to S2, in which the speed Vn of the vehicle is read. The process proceeds to S3, in which the relative speed Vr and the relative deceleration αr with respect to the object body are determined based on the amount of change (ΔX, ΔZ) in the relative position and the like. Subsequently, the process proceeds to S4, in which it is determined whether the object body is another preceding vehicle. If it is determined that the object body is a body in a moving state, that is, another preceding vehicle, a vehicle-ahead flag is set.

In S5, the inter-vehicle time set by an operator, that is, the requested inter-vehicle time T*, is read. In S6, an actual inter-vehicle time T(=inter-vehicle distance Z÷speed Vn of the vehicle) is determined, and an inter-vehicle time deviation ΔT(=T–T) is determined.

In S7, a target deceleration is determined based on the inter-vehicle time deviation ΔT and the relative speed Vr. If the inter-vehicle time deviation ΔT is at least "0" and the requested inter-vehicle time is shorter than the actual inter-vehicle time, such a condition indicates that the actual inter-vehicle time is insufficient with respect to the requested value. That is, there is a need for deceleration. The need for deceleration increases with increases in the inter-vehicle time deviation ΔT. If the inter-vehicle time deviation ΔT is less than "0" and the actual inter-vehicle time is longer than the requested inter-vehicle time, such a condition indicates that the inter-vehicle distance is sufficient. That is, there is no need for deceleration, or there is a need for acceleration.

Figure 8:
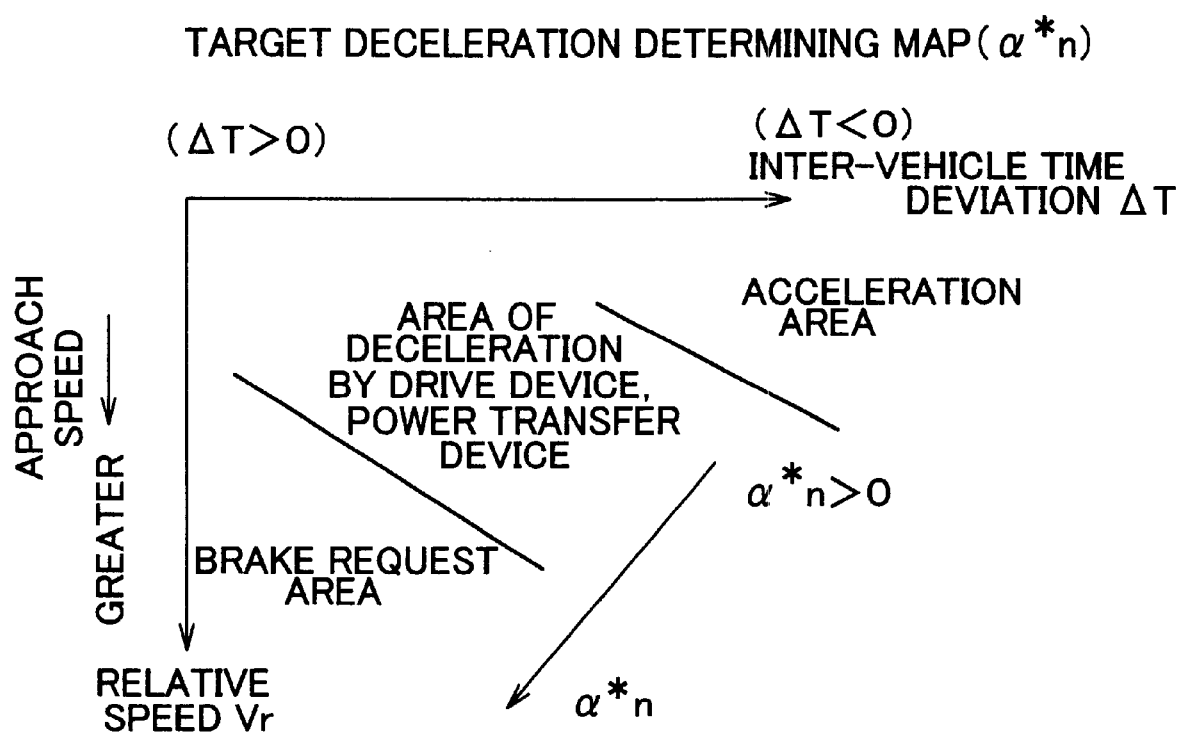
FIG. 8 is a map indicating a target deceleration determining table stored in the ROM of the vehicle spacing control ECU.

As indicated in a map shown in FIG. 8, the target deceleration α*n is increased with increases in the absolute value of the inter-vehicle time deviation ΔT provided that the inter-vehicle time deviation ΔT is at least "0". If the inter-vehicle time deviation ΔT is less than "0", the target deceleration α*n is reduced so that an acceleration area is eventually entered, with increases in the absolute value of the inter-vehicle time deviation ΔT. The target deceleration α*n is set greater when the approach speed, that is, the relative speed Vr, is relatively great than when the approach speed is relatively small. This is because the need for deceleration is higher when the approach speed is relatively great than when it is relatively small.

The target deceleration may be determined based on an inter-vehicle time deviation ratio (ΔT/T*) obtained by dividing the inter-vehicle time deviation by a requested inter-vehicle time, instead of the inter-vehicle time deviation ΔT. It is also possible to use the inter-vehicle distance instead of the inter-vehicle time. Any value may be used as long as it is a value related to a deviation obtained by subtracting an actual relative positional relationship from a requested relative positional relationship that is a relative positional relationship with respect to the preceding vehicle requested by the operator, in other words, a value that indicates the need for deceleration. A target deceleration can be determined based on the deviation or a quantity related to the deviation, such as the ratio of the deviation or the like.

Figure 6:
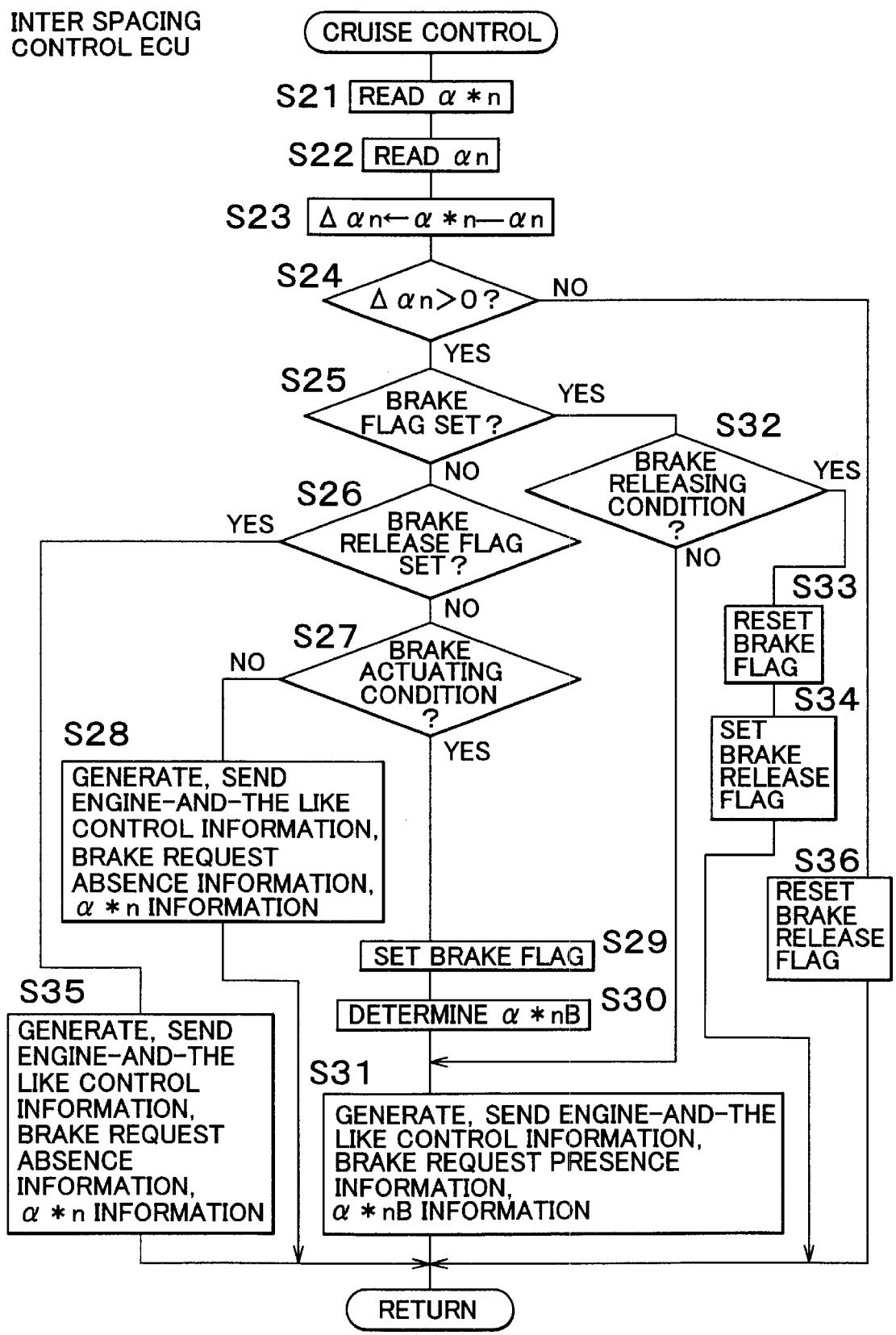
FIG. 6 is a flowchart illustrating a cruise control program stored in the ROM of the vehicle spacing control ECU.

A cruise control program illustrated by the flowchart of FIG. 6 is executed at every predetermined set time. In S21 to S23, the target deceleration α*n is read, and the actual deceleration an of the vehicle is read, and a deceleration deviation Δαn(=α*n−αn) is determined as a difference therebetween. In S24, it is determined whether the deceleration deviation Δαn is greater than "0". If the deceleration deviation Δαn is greater than "0", the decelerating control is executed. If the deceleration deviation Δαn is at most "0", an accelerating control is executed.

In S25, it is determined whether a brake flag is in a set state. In S26, it is determined whether a brake release flag is in a set state. If each flag is in a reset state, it is determined in S27 whether the brake operating condition is met. If the brake operating condition is not met, the process proceeds to S28, in which information for control of the engine or the like is prepare and brake request absence information indicating that there is no need for a brake request is prepared. Furthermore in S28, the prepared information as well as information indicating the target deceleration α*n are transmitted to the engine ECU 14.

If the deceleration deviation Δαn is smaller than the 0th threshold ΔΔs0 as mentioned above, a throttle opening control command is generated. If the deceleration deviation Δαn is at least the 0th threshold Δαs0, a throttle complete closure command is generated. If the deceleration deviation Δαn is at least the 1st threshold Δαs1, an overdrive-cut command and the throttle complete closure command are generated. If the deceleration deviation Δαn is at least the 2nd threshold Δαs2, a downshift-to-3rd speed command and the throttle complete closure command are generated. Then, the information for control of the engine or the like (a throttle control command, a speed ratio control command) as well as the information indicating the target deceleration α*n and the brake request absence information is transmitted to the engine ECU 14.

Conversely, if the brake operating condition is met, the process starting at S29 is executed. The brake operating condition includes the following four conditions: (a) the deceleration deviation Δαn is greater than the 3rd threshold Δαs3; (b) the object body is another preceding vehicle;, (c) the same-lane probability K is at least a set probability; and (d) the inter-vehicle distance is less than a set distance. If all the four conditions are met, the brake operating condition is met. The set distance in the condition (d) is a value that allows reliable detection of the presence/absence of an object body and that is determined by the performance capabilities of the laser radar device 20. If the brake operating condition is met, it is indicated that the vehicle is in a state where the need to decelerate the vehicle is high. That is, a state where the actual deceleration is insufficient with respect to the target deceleration and where another preceding vehicle of tie vehicle during operation is detected with high probability.

The conditions (b) to (d) can be combined as a brake start pre-condition. Thus, the brake 62 is operated when it is determined that the need to operate the brake is high, so that unnecessary operation of the brake can be avoided.

If a plurality of object bodies are detected by the laser radar device 20 and information indicating a relative position of each body is transmitted, a vehicle that is the closest to the vehicle among the preceding vehicles of the plurality of bodies detected is set as an object vehicle. A relative positional relationship with respect to the object vehicle, such as the inter-vehicle distance, the relative speed, the relative deceleration, etc. is determined. Furthermore, it is determined whether the same-lane probability K is at most a set probability Ks.

In S29, the brake flag is set. In S30, a target deceleration $\alpha*nB$ in the brake control is determined. Subsequently in S31, brake request presence information and engine and the like control information are prepared, and are transmitted to the engine ECU 14 together with information indicating the desired brake target deceleration $\alpha*nB$. If the brake is in operation, the engine and the like control information is information indicating the downshift-to-third speed command or the throttle complete closure command in a normal case.

Figure 9:
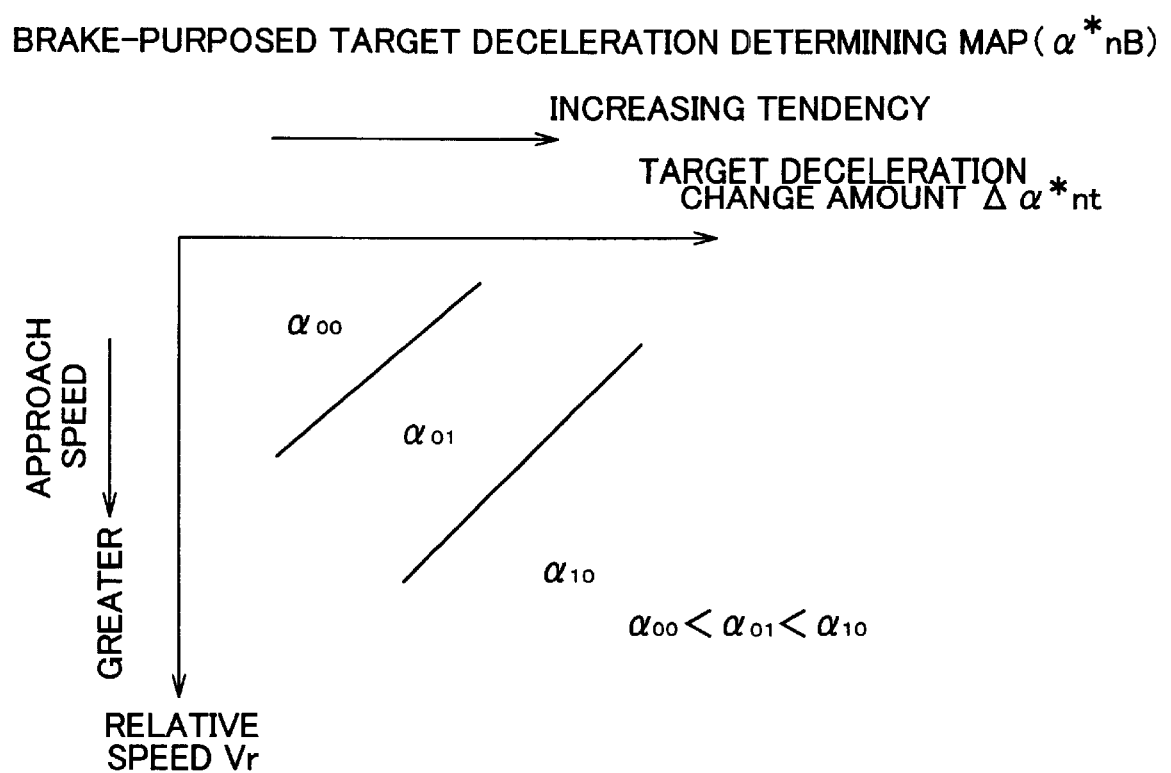
FIG. 9 is a map indicating a desired brake target deceleration determining table stored in the ROM of the vehicle spacing control ECU.

The desired brake target deceleration $\alpha*nB$ is determined in accordance with a desired brake target deceleration determining table indicated by a map of FIG. 9. The desired brake target deceleration $\alpha*nB$ is determined based on the amount of change $\Delta\alpha*nt$ in the target deceleration $\alpha*n$ with respect to time (hereinafter, referred to as "target deceleration change amount") and the relative speed Vr occurring when the brake operating condition is met.

If the target deceleration change amount $\Delta\alpha*nt$ is a positive value, it is indicated that the desired brake target deceleration $\alpha*nB$ tends to increase as indicated by $\alpha_{00} < \alpha_{01} < \alpha_{10}$ in FIG. 9, and the need for deceleration tends to increase. Conversely, if the target deceleration change amount $\Delta\alpha*nt$ is a negative value, the desired brake target deceleration $\alpha*nB$ tends to decrease, and the need for deceleration tends to decrease. Thus, according to the target deceleration change amount $\Delta\alpha*nt$, the need for deceleration can be predicted. Based on the target deceleration change amount $\Delta\alpha*nt$, it means that desired brake target deceleration $\Delta\alpha*nB$ is determined on the basis of the predicted value of the need for deceleration.

If the target deceleration change amount $\Delta\alpha*nt$ is a positive value, the: desired brake target deceleration $\alpha*nB$ is increased with increases in the absolute value of the target deceleration change amount $\Delta\alpha*nt$. Furthermore, the desired brake target deceleration $\alpha*nB$ is increased with increases in the approach speed.

The brake operating condition is not limited to the aforementioned conditions. For example, in addition to the aforementioned conditions, it is possible to adopt at least one of the following conditions: (e) the downshift-to-third speed command has been generated; (f) the accelerating control is not requested (the deceleration deviation $\Delta\alpha n$ is greater than "0"); (g) the throttle complete closure command has been generated; (h) the accelerator pedal is not operated; (i) none of the antilock brake control, the vehicle behavior control, etc. is being performed; etc.

It is a normal operation to decelerate the vehicle by controlling the engine or the like before the brake 62 is actuated. However, with respect to the throttle control device 36 or the transmission 40, predetermined control is performed as mentioned above, which is adopted as a condition. Furthermore, with regard to the brake device 54, a condition that the brake device 54 is in a state that allows automatic braking in accordance with the cruise control is adopted.

If the brake control is being executed, it is determined in S32 whether a brake releasing condition is met. If the brakes releasing condition is not met, the brake control is continued. Subsequently, S31 is executed. In this case, the value of the desired brake target deceleration $\alpha*nB$ is the same as the previous value. Thus, in this embodiment, after the brake operating condition is met, the same value of the desired brake target deceleration $\alpha*nB$ is maintained until the first brake operation ends. However, since the desired brake target deceleration $\alpha*nB$ is determined based on a predicted value of the need for deceleration as described above, an undesired event is avoided in which the value of the desired brake target deceleration $\alpha*nB$ immediately becomes a value that is remarkably inappropriate with respect to the relative positional relationship between the vehicle and the object body.

It is possible to adopt a construction in which during operation of the brake 62, the desired brake target deceleration $\alpha*nB$ is changed. For example, in some cases, it is desirable to change the desired brake target deceleration $\alpha*nB$ if the target deceleration $\alpha*n$ has been changed from the value provided at the time of start of the brake operation by at least a set amount. It is also possible to change the desired brake target deceleration $\alpha*nB$ if there is a change of at least a set amount in the relative positional relationship between the vehicle and the object body, such as the inter-vehicle time, the inter-vehicle distance, etc., as well as the target deceleration $\alpha*n$. Furthermore, during brake operation, the desired brake target deceleration $\alpha*nB$ may be suitably changed to a value determined in accordance with a map prepared based on the target deceleration change amount $\Delta\alpha*nt$ and the relative speed Vr. If determined in accordance with the map, the desired brake target deceleration $\alpha*nB$ is not continuously changed in accordance with continuous changes in the target deceleration change amount $\Delta\alpha nt$ or the relative speed Vr, but is changed discretely. Therefore, the frequency of a change in the desired brake target deceleration $\alpha*nB$ can be reduced, in comparison with a case where the desired brake target deceleration $\alpha*nB$ is continuously changed.

The brake releasing condition may be at least one of the following conditions: (a) the target deceleration $\alpha*n$ has become smaller than a brake release threshold $\alpha B$; (b) detection of the preceding vehicle discontinues; (c) the deceleration via the brake device 54 has become unnecessary (the downshift-to-third speed command is not generated, the accelerator pedal has been depressed, or the accelerating control command has been generated); (d) the brake device 54 has entered a state in which continuation of the cruise control is inappropriate (a system abnormality has been detected, the antilock brake control or the vehicle behavior control has been started, or the time of continuous operation of the brake has become equal to or longer than a set time).

In some cases, the deceleration deviation $\Delta\alpha n$ becomes less than the 2nd threshold $\Delta\alpha s2$ before the target deceleration $\alpha*n$ becomes smaller than the brake release threshold $\alpha B$. If the downshift-to-third speed command has been cancelled, it may be considered that the deceleration via the brake 62 has become unnecessary. Thus, it is determined whether the brake releasing condition is met based on the state of detection of another preceding vehicle, the state of control of the engine or the like, the state of operation of the brake device 54, etc. If the brake releasing condition is met, the brake flag is reset in S33, and the brake release flag is set in S34.

If the brake releasing condition is set, the determination in S26 becomes affirmative ("YES"). Subsequently in S35, the engine and the like control command is generated. If in this case, the target deceleration $\alpha^*n$ is smaller than the 4th threshold $\alpha s4$ as indicated in FIG. 4, information for discontinuing the restriction of the transmission speed ratio (speed-ratio normal control permission command) is generated, and is transmitted to the engine ECU 14 together with the brake request absence information, and information indicating the target deceleration $\alpha^*n$. If the target deceleration $\alpha^*n$ is smaller than the 5th threshold $\alpha s5$, information for discontinuing the complete closure of throttle (throttle control command) is generated.

Thus, in this embodiment, the control of the throttle control device 36 and the transmission 40 performed before the application of the brake is different from the control thereof performed after release of the brake.

Furthermore, if the deceleration deviation $\Delta\alpha n$ becomes equal to or less than "0", the determination in S24 becomes negative ("NO"). Subsequently in S36, the brake release flag is reset.

Although the embodiment has been described in conjunction with the tables indicated by the maps of FIGS. 8 and 9, the maps are not intended to be restrictive. For example, the maps are not limited to two-dimensional maps, but may also be maps of three or more dimensions. In that case, it is possible to adopt a construction in which, for example, the inter-vehicle distance is taken into account. The maps do not need to be of a particular fixed type, but may also be changed in accordance with the continuously varying operating conditions. For example, it is possible to adopt a construction in which a threshold or a map value is changed based on the frequency of selection, the time of continuation of the same value setting, etc.

As a result, it becomes possible to change a map in accordance with an operator's preference regarding deceleration.

Figure 7:
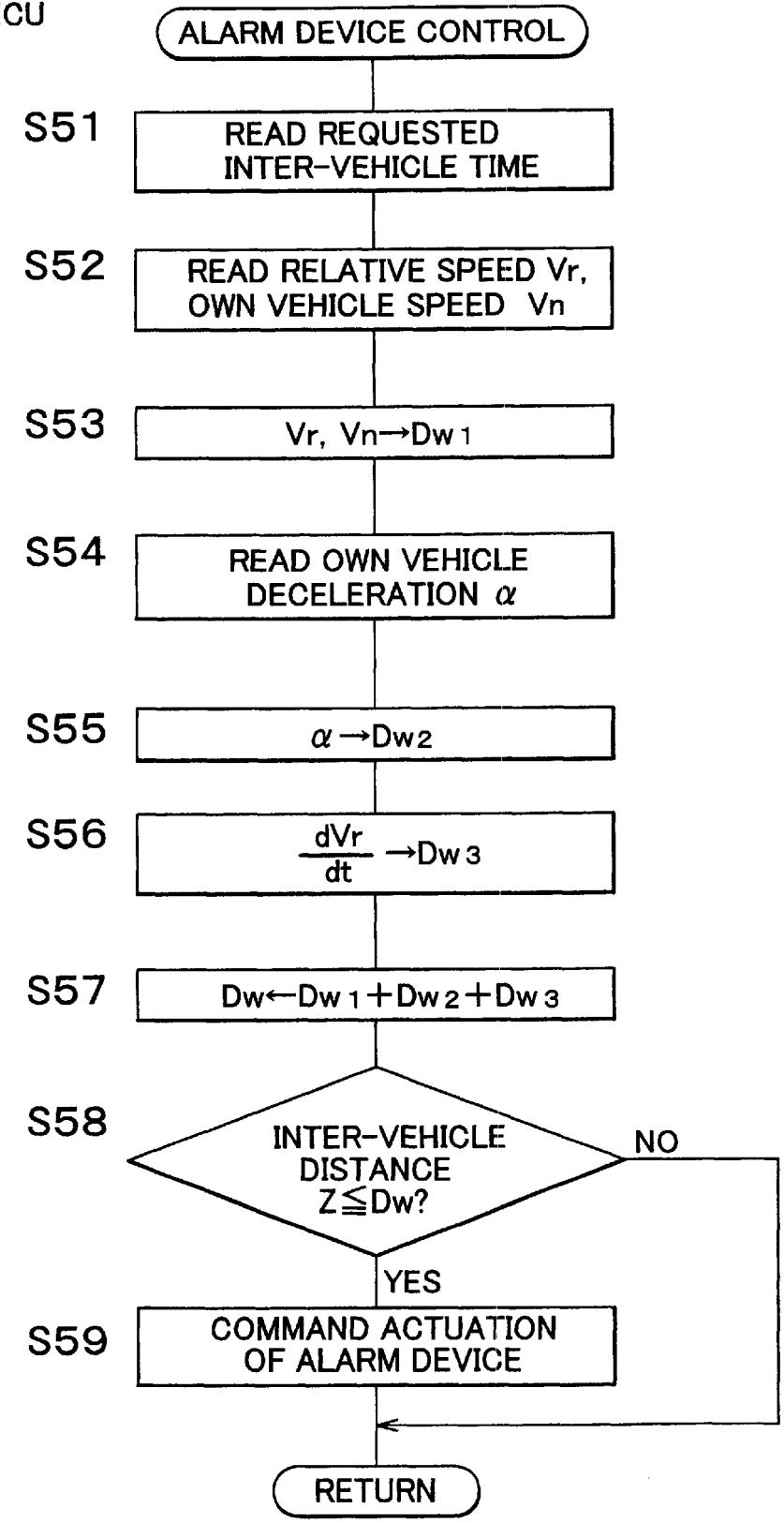
FIG. 7 is a flowchart illustrating an alarm control program stored in the ROM of the vehicle spacing control ECU.
Figure 10:
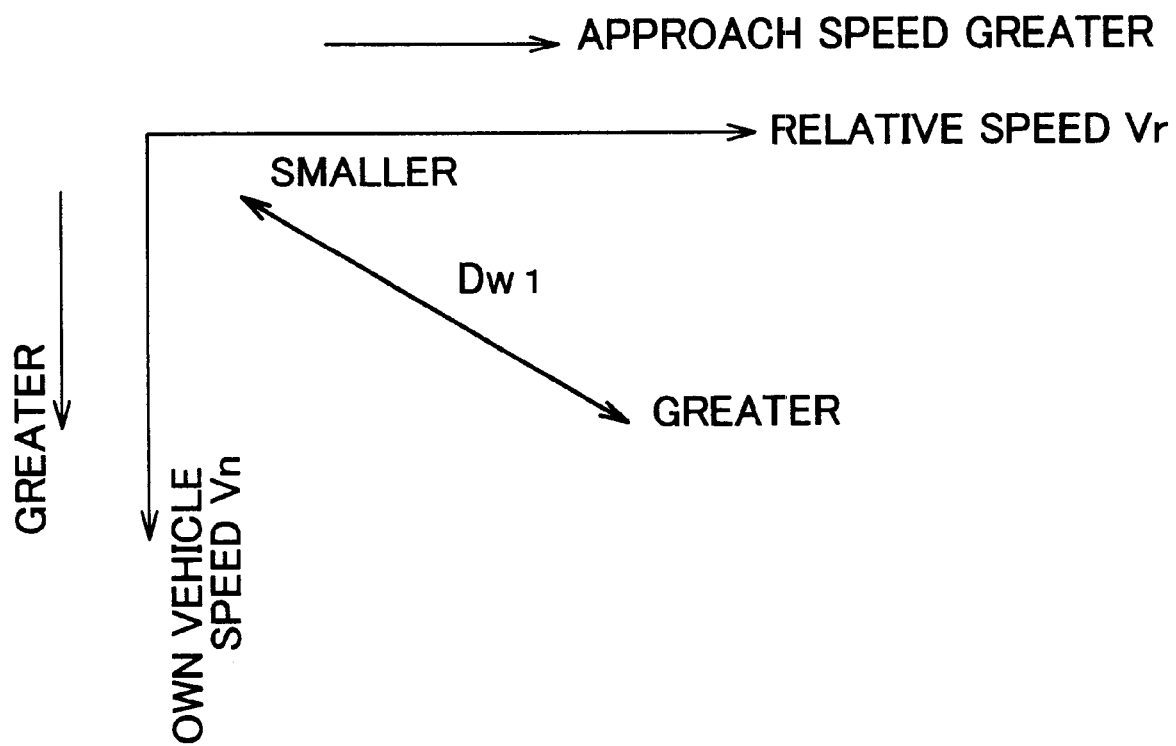
FIG. 10 is a map indicating a first approach distance determining table stored in the ROM of the vehicle spacing control ECU.

An alarm device control program illustrated by the flowchart of FIG. 7 is executed at various predetermined set times. In S51 to S53, a first approach distance $Dw_1$, is determined based on the requested inter-vehicle time T*, the relative speed Vr, and the speed Vn of the vehicle, in accordance with a first approach distance determining table represented by a map shown in FIG. 10. In this case, similar tables are provided separately for the requested inter-vehicle times T*. Therefore, a table corresponding to the present requested inter-vehicle time T* is selected. Using the selected table, a first approach distance $Dw_1$ is determined based on the relative speed Vr and the speed Vn of the vehicle. The approach distance is increased with increases in the relative speed Vr and with increases in the speed Vn of the vehicle. The approach distance is also increased with increases in the requested inter-vehicle time T*.

Figure 11:
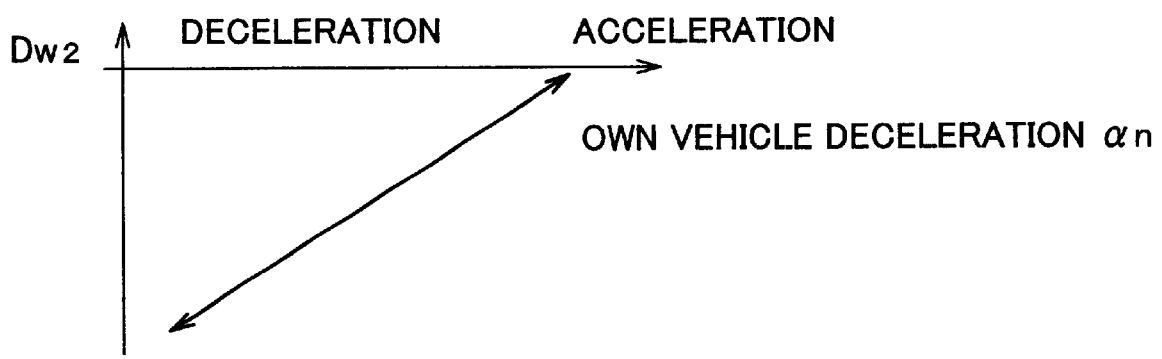
FIG. 11 is a map indicating a second approach distance determining table stored in the ROM of the vehicle spacing control ECU.
Figure 12:
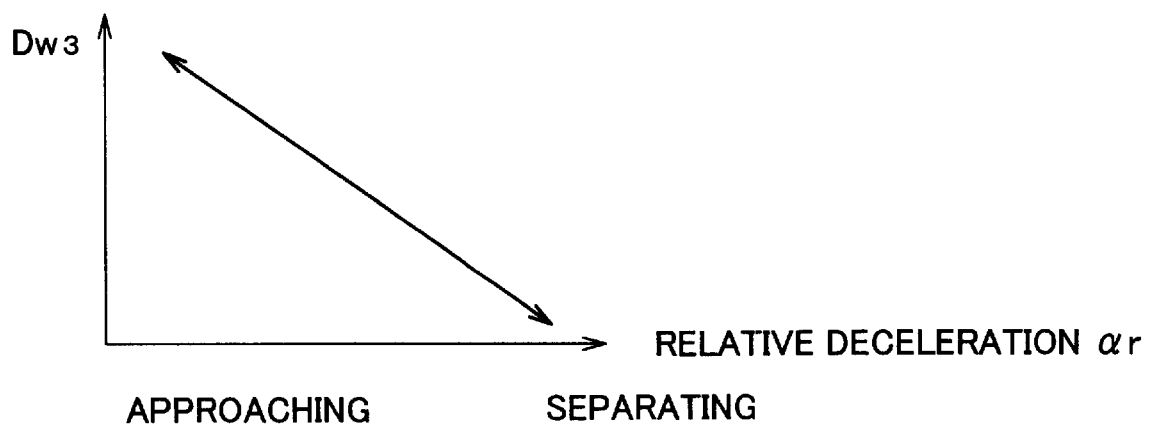
FIG. 12 is a map indicating a third approach distance determining table stored in the ROM of the vehicle spacing control ECU.

Next, in S54 and S55, a second approach distance $Dw_2$ is determined based on the actual deceleration an of the vehicle. The second approach distance $Dw_2$ is determined in accordance with a second approach distance determining table represented by a map shown in FIG. 11. The second approach distance $Dw_2$ is decreased (negative values having great absolute values) with increases in the actual deceleration an of the vehicle. If the actual deceleration $\alpha n$ of the vehicle is great, an operator feels safe. In such a case, therefore, the approach distance Dw is reduced so as to delay the alarm actuation timing. In S56, a third approach distance $Dw_3$ is determined based on the relative deceleration $\alpha r$ (dVr/dt) in accordance with a third approach distance determining table represented by a map shown in FIG. 12. The third approach distance $Dw_3$ is set smaller when there is a strong separating tendency than when there is a strong approaching tendency. If there is a strong separating tendency, that is, if the relative deceleration $\alpha r$ is great, the approach distance is reduced to delay the alarm actuation timing, in comparison with a case where the relative deceleration $\alpha r$ is small.

In S57, the approach distance Dw is determined as the sum of the first to third approach distances ($Dw_1+Dw_2+Dw_3$). In S58, it is determined whether the present inter-vehicle distance Z is less than the approach distance Dw. If the present inter-vehicle distance Z is greater than the approach distance Dw, the alarm device 52 is not actuated. If the present inter-vehicle distance Z is at most the approach distance Dw, information indicating a command to actuate the alarm device 52 is generated, and is transmitted to the engine ECU 14 in S59. Thus, the approach distance at which the alarm device 52 is actuated is determined as a value corrected based on the deceleration $\alpha n$ of the vehicle and the relative deceleration $\alpha r$. Since the value of approach distance is determined taking into account the secure feeling of an operator caused by deceleration and the actual state of approach, an uncomfortable feeling of an operator caused by occurrence of an alarm can be reduced. In this embodiment, regardless of whether an object body is in a relative static state or a relative moving state (another preceding vehicle), an alarm device actuation command is generated if the inter-vehicle distance Z becomes equal to or less than the approach distance.

The maps for use in determining the approach distance are not restricted by the above-described embodiment. It is possible to adopt multi-dimensional maps similar to the maps shown in FIGS. 8 and 9, or to change maps in accordance with learning. The approach distance may be increased, for example, if a system abnormality is detected. For example, the approach distance is increased if the actual deceleration is less by at least a set value than a deceleration expected to be reached due to the cruise control (target deceleration). The approach distance Dw may also be determined by multiplying the first approach distance $Dw_1$ by a deceleration correction value determined based on the deceleration of the vehicle, a relative deceleration correction value determined based on the relative deceleration, etc. The deceleration correction value is decreased with increases in the deceleration of the vehicle. The relative deceleration correction value is decreased with increases in the relative deceleration.

Figure 13:
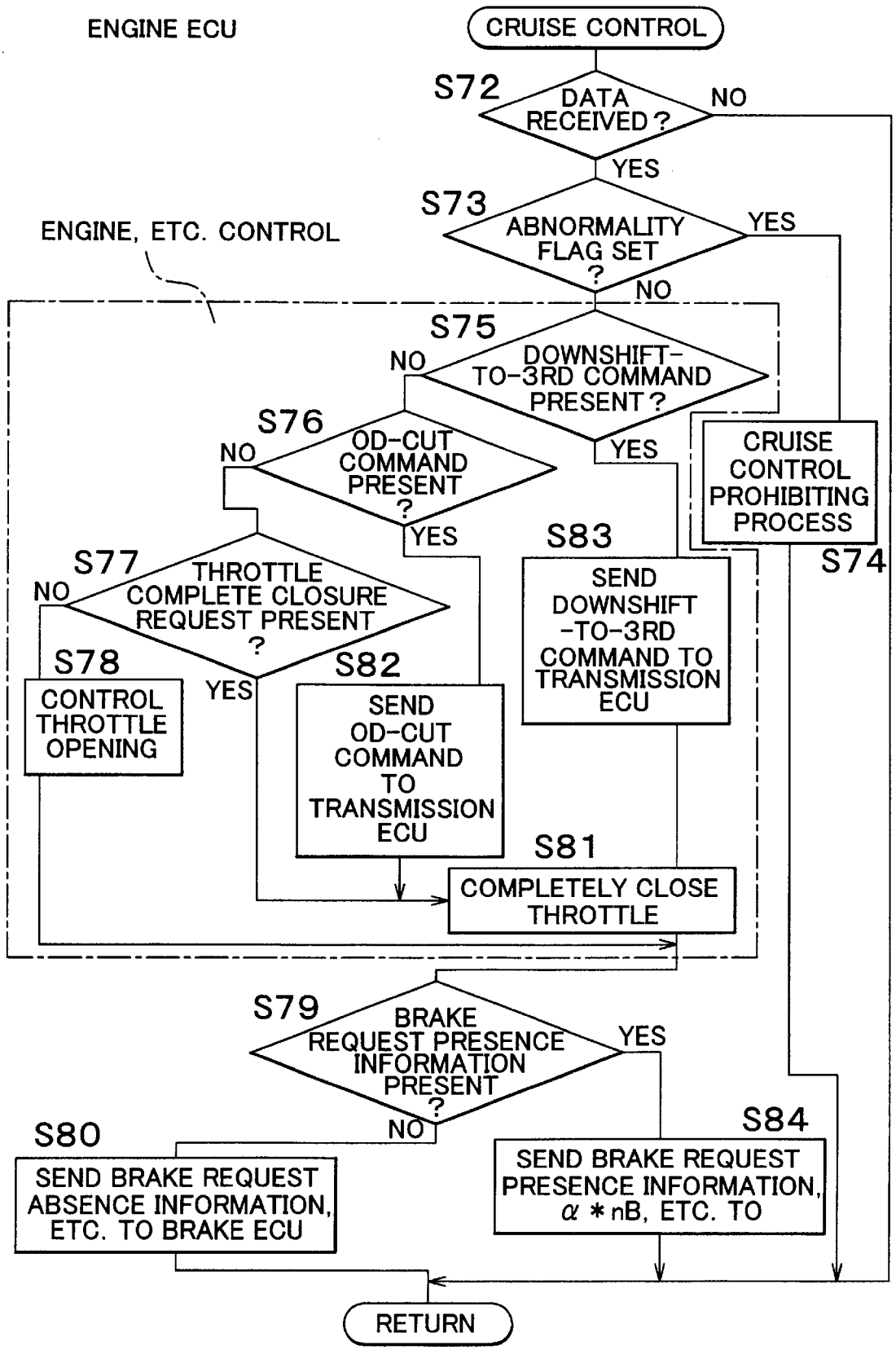
FIG. 13 is a flowchart illustrating a cruise control program stored in a ROM of an engine ECU shown in FIG. 1.

The engine ECU 14 executes a cruise)control program illustrated by the flowchart of FIG. 13, at various predetermined set times. A set time may be set to a time of transmission of information from the vehicle spacing control ECU 12. It is also practicable for the engine ECU 14 to execute the program every time information is received from the vehicle spacing control ECU 12. In S72, it is detected whether information has been received from the vehicle spacing control ECU 12. If information has been received from the vehicle spacing control ECU 12, it is determined in S73 whether an abnormality flag is in a set state. If the abnormality flag, which is described later, is in the set state, the cruise control is prohibited in S74. That is, a predetermined cruise control prohibiting process is performed.

If the abnormality flag is in a reset state, the engine or the like is controlled in accordance with the engine control information in a process starting at S75. In this embodiment, control of the engine or the like is performed in every execution of the cruise control. The control performed before actuation of the brake starts will be described herein, and the control performed after the brake is released will not be described. After release of the brake, a control in accordance with a speed ratio normal control permission command, a throttle control command, etc. is performed.

In S75 to S77, the engine ECU 14 determines whether the downshift-to-third speed command is contained, whether the overdrive-cut command is contained, and whether the throttle complete closure command is contained, respectively.

If all the determinations are negative ("NO"), the process proceeds to S78, in which the degree of throttle opening is controlled by control of the throttle control device 36 so as to achieve the target deceleration $\alpha^*n$ without controlling the transmission speed ratio.

A degree of throttle opening that will achieve the target deceleration $\alpha^*n$ is determined. A command value corresponding to the degree of throttle opening is outputted to the throttle control device 36. In S79, it is determined whether the information received contains the brake request presence information. If the information is not contained, the process proceeds to S80, in which predetermined information (brake control information, information for use in detection of an abnormality described below), such as the brake request absence information or the like, is transmitted to the brake ECU 16.

If the throttle complete closure command is contained, the degree of throttle opening is set to "0". Then, if the brake request presence information is not contained, the process proceeds to S80, in which the brake request absence information and the like is transmitted to the brake ECU 16. If the overdrive-cut command is contained, the process proceeds to S82, in which the overdrive-cut command is transmitted to the transmission ECU 34. Subsequently in S81, the degree of throttle opening is set to "0". Then, if it is determined in S79 that the brake request presence information is not contained, the process proceeds to S80, in which the brake request absence information and the like is transmitted. If the downshift-to-third speed command is contained in S75, the process proceeds to S83, in which the downshift-to-third speed command is transmitted to the transmission ECU 34. Subsequently in S81, the degree of throttle opening is set to "0". If the brake request presence information is not contained, the process proceeds to S80, in which predetermined information is transmitted to the brake ECU 16 as in the aforementioned case. Conversely, if the brake request presence information is contained, the determination in S79 is affirmative ("YES"). Subsequently in S84, predetermined information, such as the brake request presence information, information indicating desired brake target deceleration $\alpha^*nB$, etc., is transmitted to the brake ECU 16.

Figure 14:
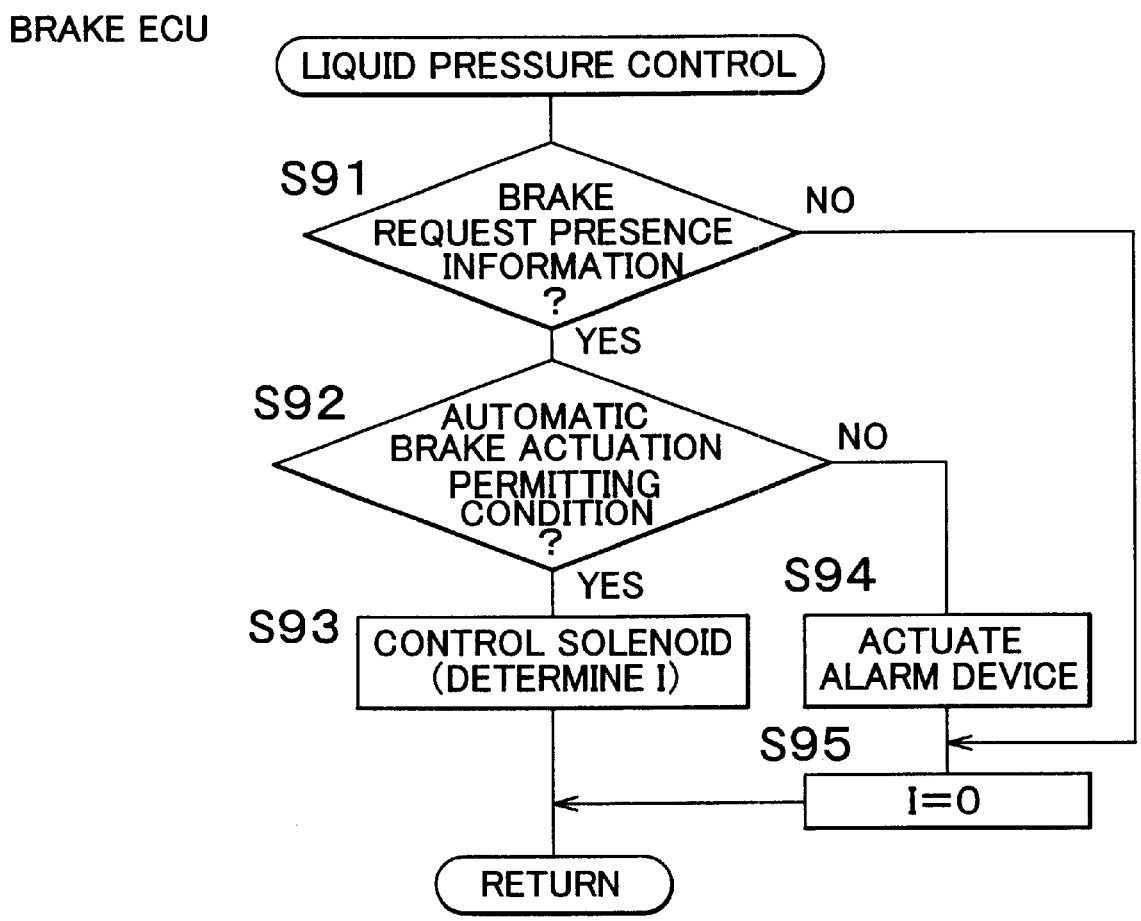
FIG. 14 is a flowchart illustrating liquid pressure control program stored in the ROM of a brake ECU shown in FIG. 1.

The brake ECU 16 executes a brake operating force (liquid pressure) control program illustrated by the flowchart of FIG. 14, at every predetermined set time.

In S91, it is determined whether the brake request presence information has been received. In S92, it is determined whether an automatic brake actuation permitting condition is met. The automatic brake actuation permitting condition is met, (a) if the temperature of a solenoid of the pressure control valve 50 is lower than a set temperature, or (b) if the slip state of each wheel is on a stable side of a set state. If the automatic brake actuation incurs a danger of degradation of running stability of the vehicle, the automatic brake actuation is prohibited. The automatic brake actuation is also prohibited if the brake device 54 is in a state where continuation of application of the brake is not desirable. If the automatic brake actuation permitting condition is met, the process proceeds to S93, in which a supply current I to the coil 104 of the pressure control valve 50 is determined so as to achieve the desired brake target deceleration $\alpha^*nB$, and the brake liquid pressure is controlled to a magnitude corresponding to the supply current I. The desired brake target deceleration $\alpha^*nB$ remains fixed during one performance of the automatic braking as mentioned above.

Figure 16:
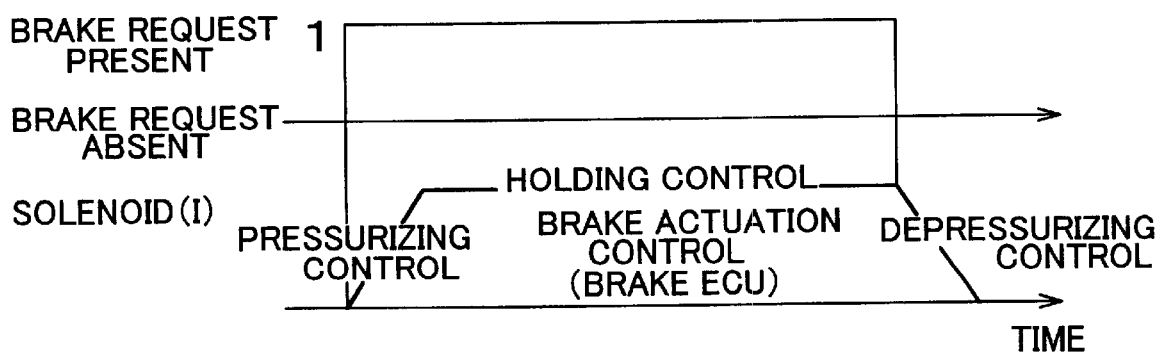
FIG. 16 is a diagram indicating a control performed by the brake ECU.

As indicated in FIG. 16, the supply current I to the pressure control valve 50 is kept fixed, and the brake liquid pressure is held at a value corresponding to the supply current I. If the desired brake target deceleration $\alpha^*nB$ is constant, the supply current I is increased, held and decreased in accordance with a predetermined pattern (e.g., in a trapezoidal pattern indicated in FIG. 16). Thus, if the desired brake target deceleration $\alpha^*nB$ is kept fixed, the brake control can be stably performed, so that control hunting can be reduced.

Furthermore, since the frequency of changes in the deceleration is reduced from the conventional level, the uncomfortable feeling that an operator may have can be reduced.

Still further, since the change in the deceleration is reduced, the running stability of the vehicle can be improved, so the security feeling of an operator can be enhanced. If the target deceleration is kept constant, it is assumed that the supply current I to the pressure control valve 50 will also be kept constant, and the brake liquid pressure will reach a pressure corresponding to the supply electric current I. Therefore, based on such circumstances, it is possible to easily detect an abnormality of the brake device 54. Furthermore, if the target deceleration is changed, it becomes difficult to set a guard value of the control command value (electric current value I) to the pressure control valve 50i However, if the target deceleration is fixed, the setting of a guard value becomes easy.

If the automatic brake actuation permitting condition is not met, the alarm device 52 is actuated in S94, and the supply electric current I to the coil 104 is set to "0" in S95. Thus, the control of the brake liquid pressure is not performed. The supply current to the coil 104 is also set to "0" if the brake request absence information is contained.

Figure 15:
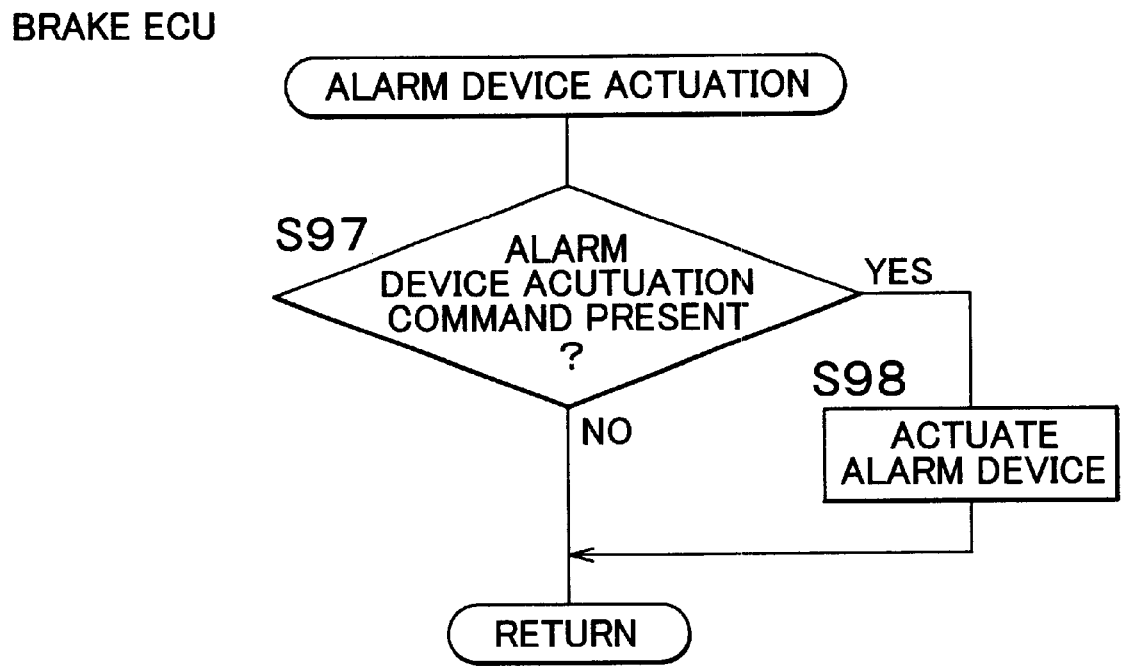
FIG. 15 a flowchart illustrating an alarm device actuating program stored in the ROM of the brake ECU.

The brake ECU 16 also executes an alarm device actuating program illustrating by the flowchart of FIG. 15, at every predetermined set time. In S97, it is determined whether an alarm device actuation command has been received. If the command has been received, the alarm device 52 is actuated in S98. That is, the alarm device 52 is actuated since the inter-vehicle distance Z has decreased to or below the approach distance Dw. In this case, the alarm device 52 produces an alarm at a timing determined based on the deceleration of the vehicle and the actual state of approach with respect to the object body, so that the uncomfortable feeling of an operator caused by the alarm can be reduced. The alarm device 52 is actuated independently of the operational state of the brake.

During application of the brake, the target deceleration is kept constant, as mentioned above. However, if during application of the brake, the deceleration of the vehicle becomes insufficient and the actual inter-vehicle distance with respect to the preceding vehicle becomes short, an alarm is produced. Therefore, an operator is prompted to perform a necessary operation, for example, depress the brake pedal 60 or the like. Thus, it is effective to perform the control of the alarm device 52 and the control of maintaining a constant target deceleration during application of the brake in a combined manner. It is also possible to actuate the alarm device 52 by an interrupt. That is, upon reception of the alarm device actuation command, S98 is immediately executed.

Next described will be detection of an abnormality. Abnormalities in the system include abnormalities of individual component elements of the system, communication abnormalities, control abnormalities, etc. If any of such abnormalities is detected, the cruise control is prohibited. The abnormalities of component elements are, for example, abnormalities in various sensors, the throttle opening control actuator, the brake control actuator, the transmission, etc. These abnormalities can be detected at the time of an initial check and the like. The initial check is not described herein.

The communication abnormalities are, for example, (a) an abnormality that the information reception time interval is not a predetermined time interval, (b) an abnormality that if information with a continuity is contained in information received, the continuity is not secured, (c) an abnormality that in a mirror check of information received, information and inverted information are not in a relationship of inversion, etc.

The control abnormalities are caused by a misoperation or non-operation of a computer, control actuator and the like, communication mutation, etc. In this embodiment, a control abnormality is detected based on whether the contents of two or more pieces of information have a logical consistency (logical abnormality). At least one of the two or more pieces of information may be a piece of control information (e.g., engine and the like control information, information indicating the presence/absence of a brake request, information indicating a target deceleration, etc.). This is because both the engine ECU 14 and the brake ECU 16 are operated in accordance with control information from the vehicle pacing control ECU 12. At least one of the two or more pieces of information may also be vehicle state information indicating the state of the cruise control switch 26, a value detected by a sensor, etc. The aforementioned desired cruise control vehicle information is an example of the vehicle state information. With the above-described arrangement, it is possible to acquire information indicating an actual control result, information serving as a reference for use in generating control information, etc. Since the control information is transmitted via communication lines between the ECUs, the control information may be termed communication information. The vehicle state information includes information that is transmitted to another ECU via communication, and information that is not transmitted to another ECU via communication. The information that is transmitted may be considered communication information.

The control abnormalities are detected in: (a) a case where at least two of a plurality of pieces of communication information received do not have a logical consistency; (b) a case where a piece of communication information transmitted from the ECU to another ECU and a piece of communication information transmitted back to the ECU from the another ECU do not have a logical consistency; (c) a case where a piece of communication information received by the ECU and a piece of information generated by the ECU or a value detected by a sensor or the like connected to the ECU do not have a logical consistency; etc. A communication abnormality detecting program is executed by each ECU; at every predetermined time or every time information is transmitted.

Figure 17:
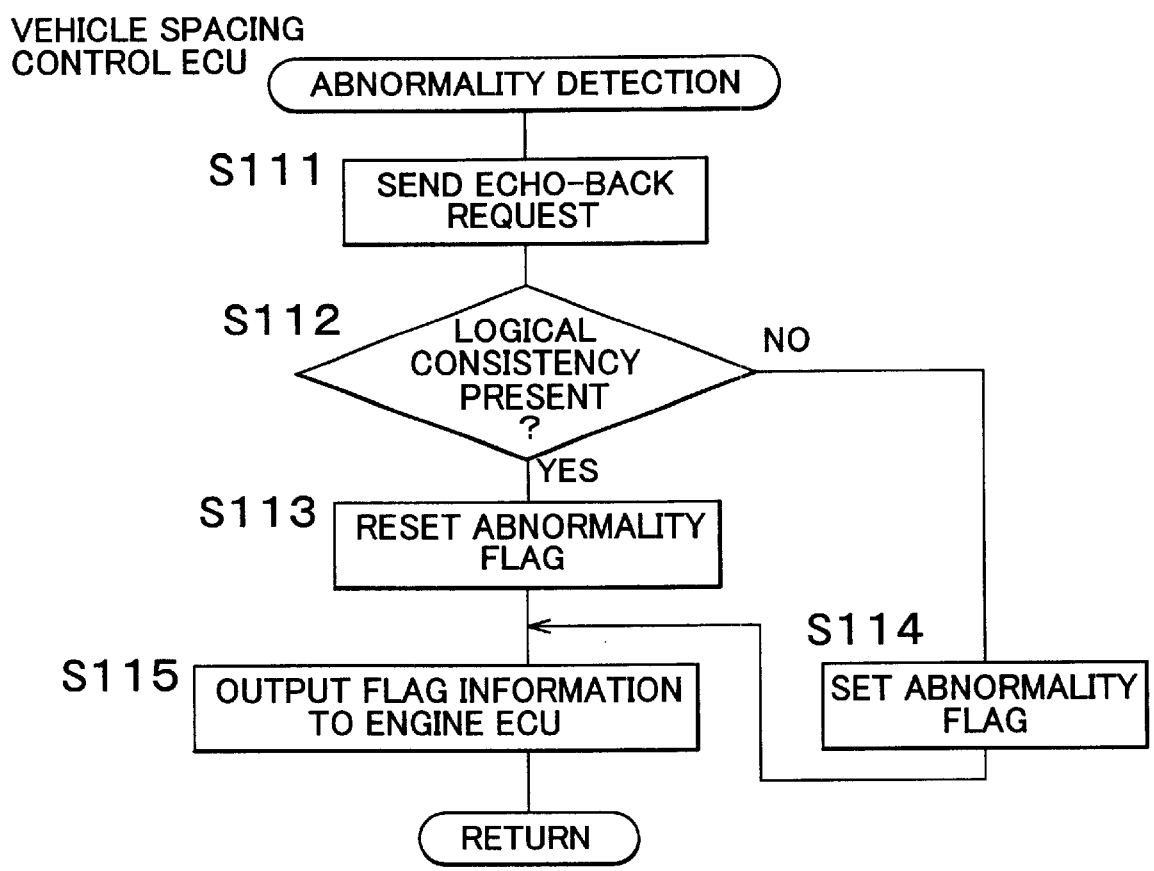
FIG. 17 is a flowchart illustrating an abnormality detecting program stored in the ROM of the vehicle spacing control ECU.

The vehicle spacing control ECU 12 executes an abnormality detecting program, illustrated by the flowchart of FIG. 17, every time the vehicle spacing control ECU 12 transmits communication information to the engine ECU 14. In S111, the vehicle spacing control ECU 12 transmits an echo-back request to the engine ECU 14. In S112, the vehicle spacing control ECU 12 determines whether or not the information transmitted from the vehicle spacing control ECU 12 to the engine ECU 14 and the information transmitted from the engine ECU 14 to the vehicle spacing control ECU 12 have a logical consistency. For example, in a case where the brake request presence information is transmitted and the information echoed-back contains the brake request absence information, it is determined that the information transmitted and the information echoed-back do not have a logical consistency. If the transmitted information and the echoed-back information have a logical consistency, an abnormality flag is reset in S113. If the transmitted information and the echoed-back information do not have a logical consistency, the abnormality flag is set in S114. Subsequently in S151, information indicating the state of the abnormality flag is transmitted to the engine ECU 14. It is also possible to adopt a construction in which, with regard to information sent back from the engine ECU 14 and received by the vehicle spacing control ECU 12, it is detected whether there is an abnormality in the state of reception of the information.

Figure 18:
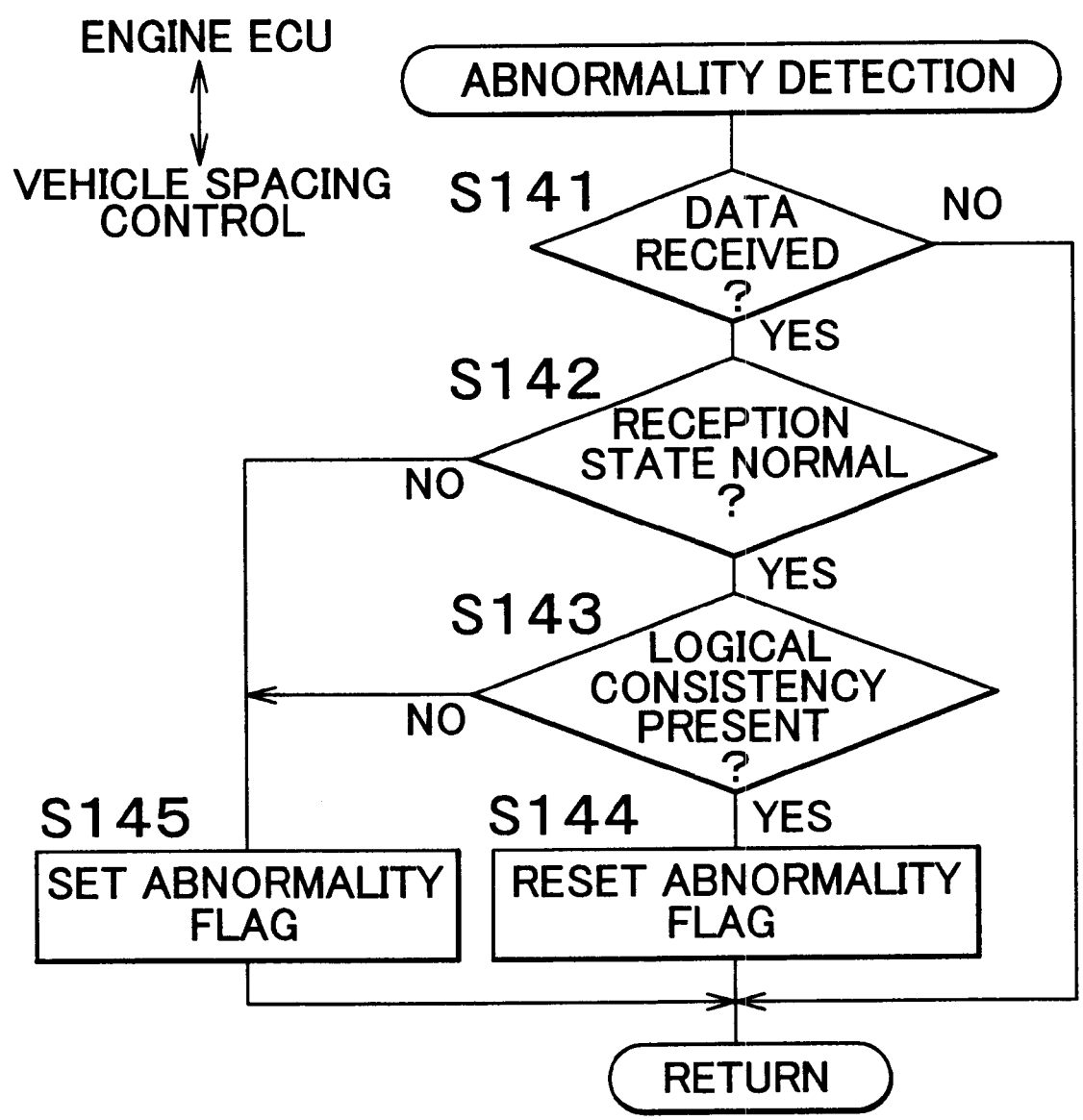
FIG. 18 is a flowchart illustrating an abnormality detecting program stored in the ROM of the engine ECU.

The engine ECU 14 detects whether there is an abnormality in both the communication with the vehicle spacing control ECU 12 and the communication with the brake ECU 16. With regard to the communication with the vehicle spacing control ECU 12, the engine ECU 14 determines in S141 in the flowchart shown in FIG. 18 whether communication information has been received. If such information has been received, it is determined in S142 whether the state of reception of the information is normal. Subsequently in S143, it is determined whether or not a logical consistency exists. For example, if the information received contains the brake request presence information and the desired brake target deceleration $\alpha^*nB$ that is a positive value, it is determined that a logical consistency exists, for example, provided that the target deceleration $\alpha^*n$ which is a positive value and the downshift-to-third speed command are contained and that the degree of throttle opening detected by the engine ECU 14 is "0". Conversely, for example, if the degree of throttle opening is great or the cruise control switch 26 is at the off position although the brake request presence information is contained in the information received, it is determined that a logical consistency does not exist. If a logical consistency exists, the abnormality flag is reset in S144. If a logical consistency does not exist, the abnormality flag is set in S145. It is also possible to adopt a construction in which the abnormality detecting program is executed every time information is received. When information is received, a process starting at S142 is executed.

Figure 19:
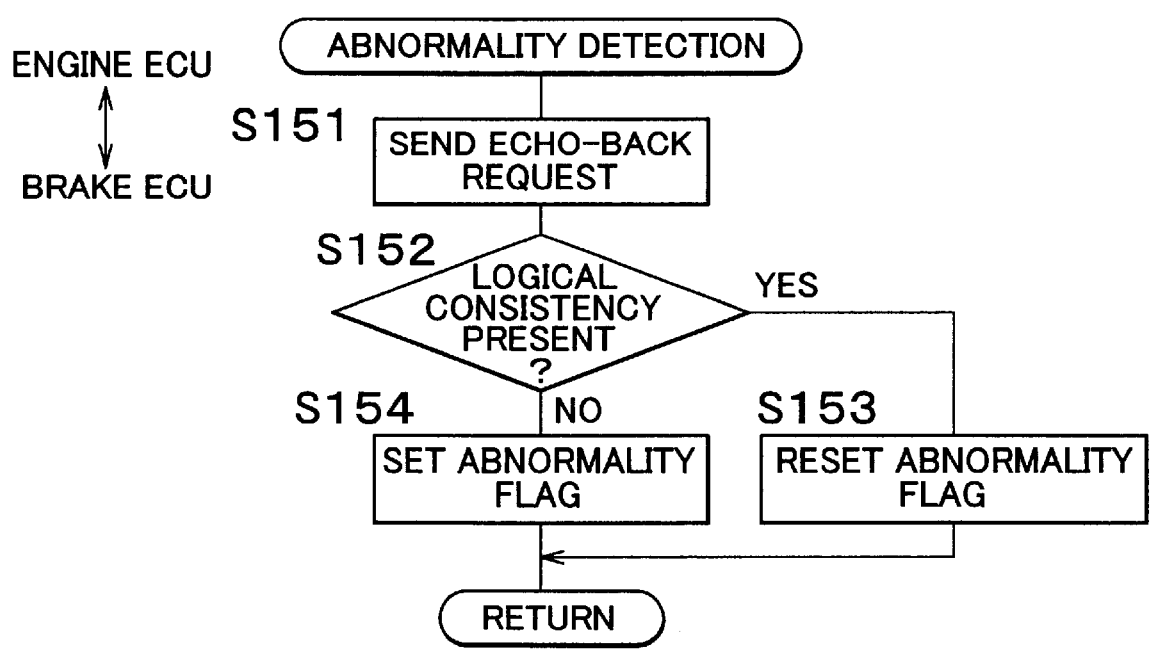
FIG. 19 is a flowchart illustrating an abnormality detecting program stored in the ROM of the engine ECU.

With regard to communication with the brake ECU 16, the engine ECU 14 transmits to the brake ECU 16 information indicating the presence/absence of a brake request and the like, and then transmits thereto an echo-back request in S151 in the flowchart shown in FIG. 19. In S152, the brake ECU 16 determines whether or not the transmitted information and the sent-back information have a logical consistency. For example, if the sent-back information contains the brake request absence information whereas the transmitted information contains the brake request presence information, it is determined that a logical consistency does not exist. If a logical consistency exists, the abnormality flag is reset in S153. If a consistency condition is not met, the abnormality flag is set in S154.

It is also possible for the engine ECU 14 to request specific information generated by the brake ECU 16, as well as the echo-back request.

For example, the engine ECU 14 may determine whether there is a logical consistency between specific information received from the brake ECU 16 and information transmitted from the engine ECU 14 to the brake ECU 16 and/or information generated by the engine ECU 14. For example, if the brake request presence information is transmitted from the engine ECU 14 to the brake ECU 16 where the information generated by the brake ECU 16 indicates that a brake in-operation flag indicating the operating state of the brake is in the set state, it is determined that a logical consistency exists. Conversely, if the cruise control switch 26 is in the on-state and the engine ECU 14 has transmitted the brake request presence information but the brake in-operation flag transmitted from the brake ECU 16 is in the reset state, it is determined that a logical consistency does not exist. Thus, in this case, it is determined whether there is a logical consistency between communication information excluding control information (control command value) received from another ECU and at least one of information generated by the ECU and information detected by the ECU.

Figure 20:
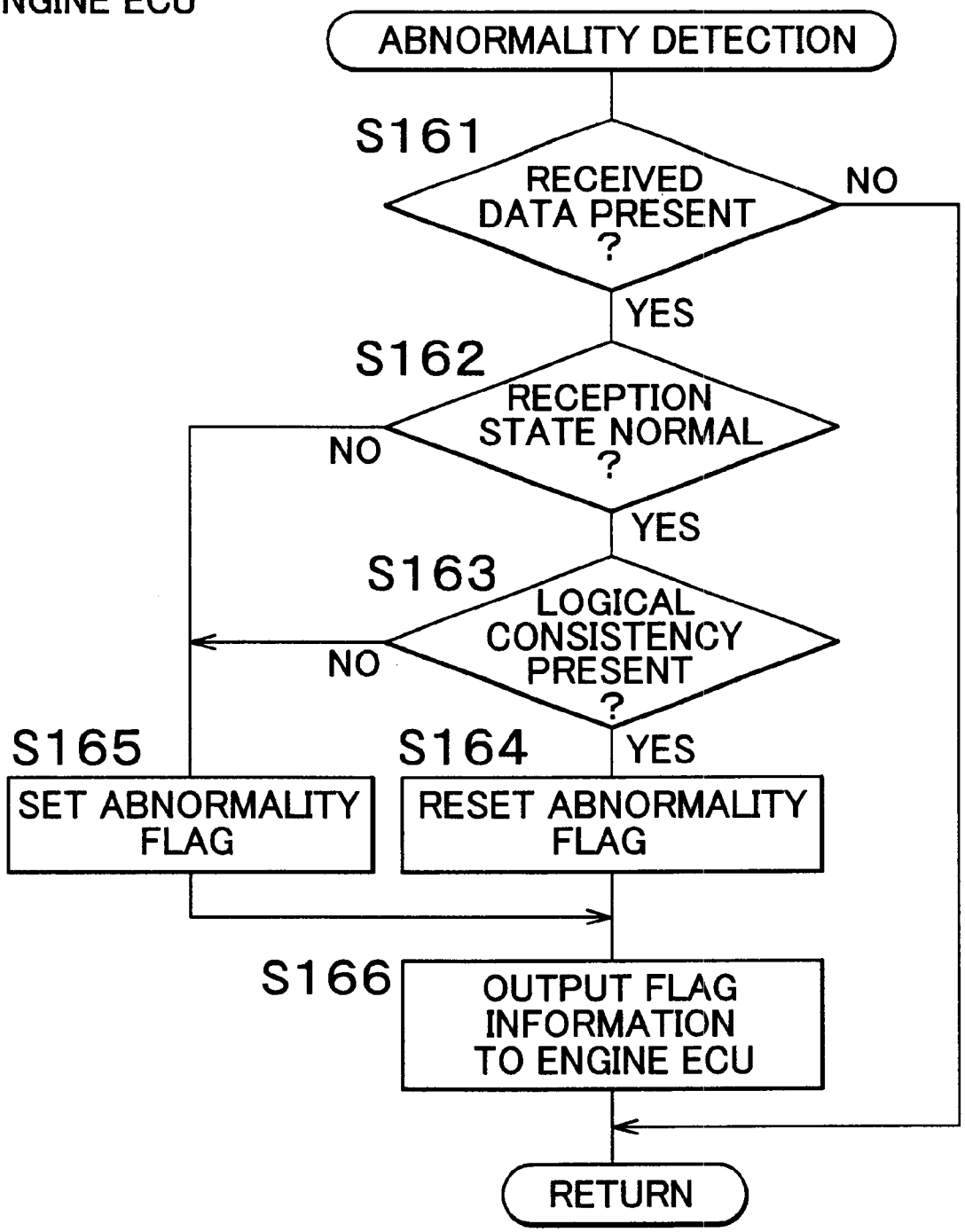
FIG. 20 is a flowchart illustrating an abnormality detecting program stored in the ROM of the engine ECU.

Likewise, the brake ECU 16 executes an abnormality detecting program illustrated by the flowchart of FIG. 20. In S162, the brake ECU 16 determines whether the state of reception is normal. In S163, the brake ECU 16 determines whether or not there is a logical consistency. For example, if information received contains the brake request presence information and information indicating the desired brake target deceleration α*nB, which is a positive value, it is determined that a logical consistency exists. In S166, the state of fan abnormality flag is transmitted to the engine ECU 14.

As described above, in the embodiment, control abnormalities are detected, as well as abnormalities of various component elements and communication abnormalities as in the conventional art. Therefore, the occasion of detection of an abnormality can be increased. Furthermore, a control abnormality can be detected in an early period. Therefore, false execution of the brake control or the engine control can be avoided, and the reliability of the system can be improved.

It is effective to adopt a design in which a control abnormality is detected in a developing stage of a system. If in the developing stage, it is detected that a logical consistency does not exist between at least two pieces of information, it means that there is a possibility of an abnormality ink a control program. Therefore, it is possible to correspondingly examine and correct a control program. In this case, it is desirable that the presence/absence of a logical consistency between at least two pieces of information containing communication information be detected. An abnormality can be detected by comparing information generated by the ECU and information generated by another ECU.

It is also practicable to adopt a construction in which if a control abnormality is detected, only the brake control is prohibited and the controls of the engine and the like are permitted. This is because with a control abnormality, the brake control has a greater effect on the running state of the vehicle. It is also possible to detect a control abnormality by utilizing information regarding communication between the engine ECU 14 and the transmission ECU 34.

The manner of the cruise control is not,limited to that described in conjunction with the foregoing embodiment. For example, the control of the engine and the like may be performed in the same manner before actuation of the brake and after release of the brake. In any case, the control can be performed based on at least one of the deceleration deviation and the target deceleration. The magnitudes of the threshold and the like may be the same before actuation of the brake and after release of the brake.

It is not essential for the vehicle operation control apparatus to be a system that includes a plurality of ECUs. The vehicle operation control apparatus may be a system that includes only one ECU. The construction of the brake circuit is not restricted by the foregoing embodiment. It is not essential for the brake circuit to allow the antilock brake control or the vehicle behavior control. Only requirement for the brake circuit is that automatic brake actuation be enabled.

The brake 62 is not limited to a hydraulic brake, but may also be an electric brake in which a friction member is pressed against a brake rotating body by an electric motor. The vehicle may be a vehicle that includes both an engine and an electric motor as drive apparatuses, and may also be a vehicle that includes an electric motor but does not include an engine. In such cases, it becomes possible to adopt a construction in which the state of operation of the electric motor provided as a drive apparatus is controlled.if the need for deceleration is low. The vehicle is not limited to an engine-driven vehicle, but may also be a hybrid vehicle, an electric vehicle, etc.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations arid configurations, which are exemplary, other combinations and configurations, including more, less or only a single element, are also within the spirit and scope of the invention.

What is claimed is:

1. A vehicle operation control apparatus for controlling a running state of a vehicle based on a relative positional relationship between the vehicle and a preceding vehicle running in a predetermined area ahead of the vehicle, comprising:
   a controller that:
      determines a target deceleration of the vehicle based on the relative positional relationship between the vehicle and the preceding vehicle;
      controls a deceleration of the vehicle so that the deceleration of the vehicle approaches the target deceleration; and
      maintains the target deceleration irrespective of a degree of the target deceleration until a predetermined condition is satisfied.

2. A vehicle operation control apparatus according to claim 1, wherein:
   the target deceleration of the vehicle is determined when the vehicle begins to decelerate in response to a braking operation of the vehicle, and the target deceleration is maintained until the predetermined condition is satisfied by at least one of the following conditions:
      the braking operation is discontinued, and
      the target deceleration is determined to be outside of a predetermined range of the relative positional relationship.

3. A vehicle operation control apparatus according to claim 2, wherein the braking operation begins if an inter-vehicle distance between the vehicle and the preceding vehicle is less than a predetermined distance.

4. A vehicle operation control apparatus according to claim 3, wherein the braking operation is discontinued if the target deceleration is less than a first predetermined value.

5. A vehicle operation control apparatus according to claim 4, wherein the controller determines the target deceleration based on at least one of, the relative positional relationship between the vehicle and the preceding vehicle, and a change in a state of a need for deceleration of the vehicle.

6. A vehicle operation control apparatus according to claim 5, wherein:

the relative positional relationship between the vehicle and the preceding vehicle is determined based on a relative speed between the vehicle and the preceding vehicle, and the target deceleration is increased as the relative speed increases.

7. A vehicle operation control apparatus according to claim 5, wherein:

the change in the state of the need for deceleration of the vehicle is represented by an amount of change in the target deceleration, and the target deceleration is increased as the amount of change in the target deceleration increases.

8. A vehicle operation control apparatus according to claim 2, wherein the braking operation begins if a deviation in the deceleration is greater than a first predetermined value.

9. A vehicle operation control apparatus according to claim 8, wherein the braking operation is discontinued if the target deceleration is less than a second predetermined value.

10. A vehicle operation control apparatus according to claim 9, wherein the controller determines the target deceleration based on at least one of the relative positional relationship between the vehicle and the preceding vehicle, and a change in a state of a need for the deceleration of the vehicle.

11. A vehicle operation control apparatus according to claim 2, further comprising:

a brake control device that controls the deceleration of the vehicle by controlling a state of operation of a brake that retards a rotation of a wheel.

12. A vehicle operation control apparatus; according to claim 1, wherein the controller determines the target deceleration based on at least one of the relative positional relationship between the vehicle and the preceding vehicle, and a change in a state of a need for the deceleration of the vehicle.

13. A vehicle operation control apparatus according to claim 1, further comprising:

an alarm that produces a warning in a form of at least one of: a sound, a lamp that turns off and on, a voice and a vibration, and wherein the alarm produces the warning as a relative speed between the vehicle and the preceding vehicle increases, and as a speed of the vehicle increases.

14. A vehicle operation control apparatus according to claim 13, wherein:

the alarm produces the warning as the deceleration of the vehicle increases, and the alarm produces the warning as the vehicle and the preceding vehicle approach each other.

15. A vehicle operation control apparatus according to claim 1, further comprising:

a brake control device that controls the deceleration of the vehicle by controlling a state of operation of a brake that retards a rotation of a wheel.

16. A vehicle operation control apparatus according to claim 1, wherein the controller comprises:

a vehicle spacing control electronic control unit;

an engine electronic control unit;

a brake electronic control unit;

a transmission electronic control unit; and an arithmetic electronic control unit.

17. A vehicle operation control apparatus according to claim 16, wherein if abnormalities are detected in any one of the electronic control units, operation of the vehicle operation control apparatus is terminated.

18. A vehicle operation control apparatus according to claim 1, wherein the vehicle is an electric power vehicle.

19. A vehicle operation control apparatus, according to claim 1, wherein the the vehicle is powered by an electric motor power source and an internal combustion engine power source.

20. A vehicle operation control apparatus according to claim 1, wherein the the brake control device is at least one of a hydraulic system and an electric system.

21. A method for controlling a running state of a vehicle based on a relative positional relationship between the vehicle and a preceding vehicle running within a predetermined area ahead of the vehicle, comprising:

determining a target deceleration of the vehicle based on the relative positional relationship between the vehicle and the preceding vehicle;

controlling a deceleration of the vehicle so that the deceleration of the vehicle approaches the target deceleration; and maintaining the target deceleration irrespective of a degree of the target deceleration until a predetermined condition is satisfied.

22. A method according to claim 21, wherein:

the target deceleration of the vehicle is determined when the vehicle begins to decelerate in response to a braking operation of the vehicle, and the target deceleration is maintained until the predetermined condition is satisfied by at least one of the following conditions:

the braking operation is discontinued, and the target deceleration is determined to be outside of a predetermined range of the relative positional relationship.

23. A method according to claim 22, wherein the braking operation begins if an inter-vehicle distance between the vehicle and the preceding vehicle is less than a predetermined distance, and a deviation in the deceleration is greater than a first predetermined value.

24. A method according to claim 23, wherein the braking operation is discontinued if the target deceleration is less than a second predetermined value.

25. A method according to claim 22, wherein the braking operation begins if a deviation in the deceleration is greater than a first predetermined value.

26. A method according to claim 22, wherein the braking operation is discontinued if the target deceleration is less than a first predetermined value.

* * * * *